United States Patent [19]

Wolfberg et al.

[11] Patent Number: 4,994,964
[45] Date of Patent: Feb. 19, 1991

[54] TRANSACTION TRACKING DATA PROCESSING SYSTEM

[75] Inventors: Larry Wolfberg, Honolulu, Hi.; Brent A. Wolfberg, Los Angeles, Calif.; Jan E. Rhoads, Virginia Beach, Va.

[73] Assignee: L & C Family Partnership

[21] Appl. No.: 39,196

[22] Filed: Apr. 16, 1987

[51] Int. Cl.⁵ .......................................... G06F 15/21
[52] U.S. Cl. .................................. 364/408; 364/900
[58] Field of Search ............... 364/408, 401, 406; 235/379

[56] References Cited

U.S. PATENT DOCUMENTS

| | | | |
|---|---|---|---|
| 4,376,978 | 3/1983 | Musmanno | 364/408 |
| 4,594,663 | 6/1986 | Nagata et al. | 364/408 |
| 4,597,046 | 6/1986 | Musmanno et al. | 364/408 |
| 4,694,397 | 9/1987 | Grant et al. | 364/408 |

Primary Examiner—Jerry Smith
Assistant Examiner—Kim Thanh Tbui
Attorney, Agent, or Firm—Nixon & Vanderhye

[57] ABSTRACT

A data processing system is disclosed which monitors client's business orders over time and based upon predetermined criteria determines the client's vested interest in funds deposited into special client accounts. The business order data is stored in uniquely formatted client account files. In addition, a vesting account file stores summary data encompassing all the client files. The data processing system updates and keeps track of client's vesting rights which are subject to change over time. The data processing system's ability to track these and many other conditions is enhanced by a unique set of control status words which control software flow and which are utilized to visually flag important statuses.

27 Claims, 17 Drawing Sheets

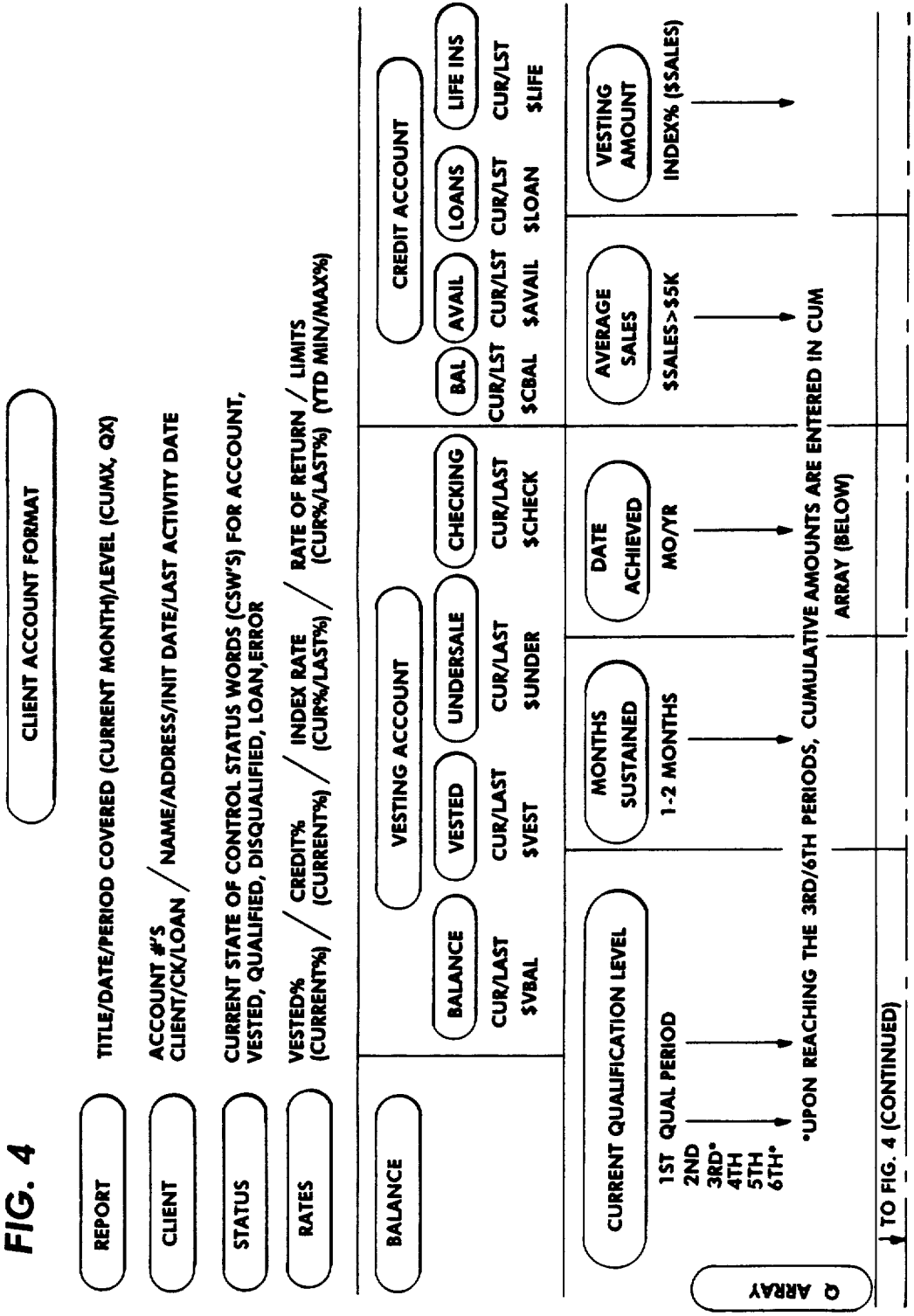

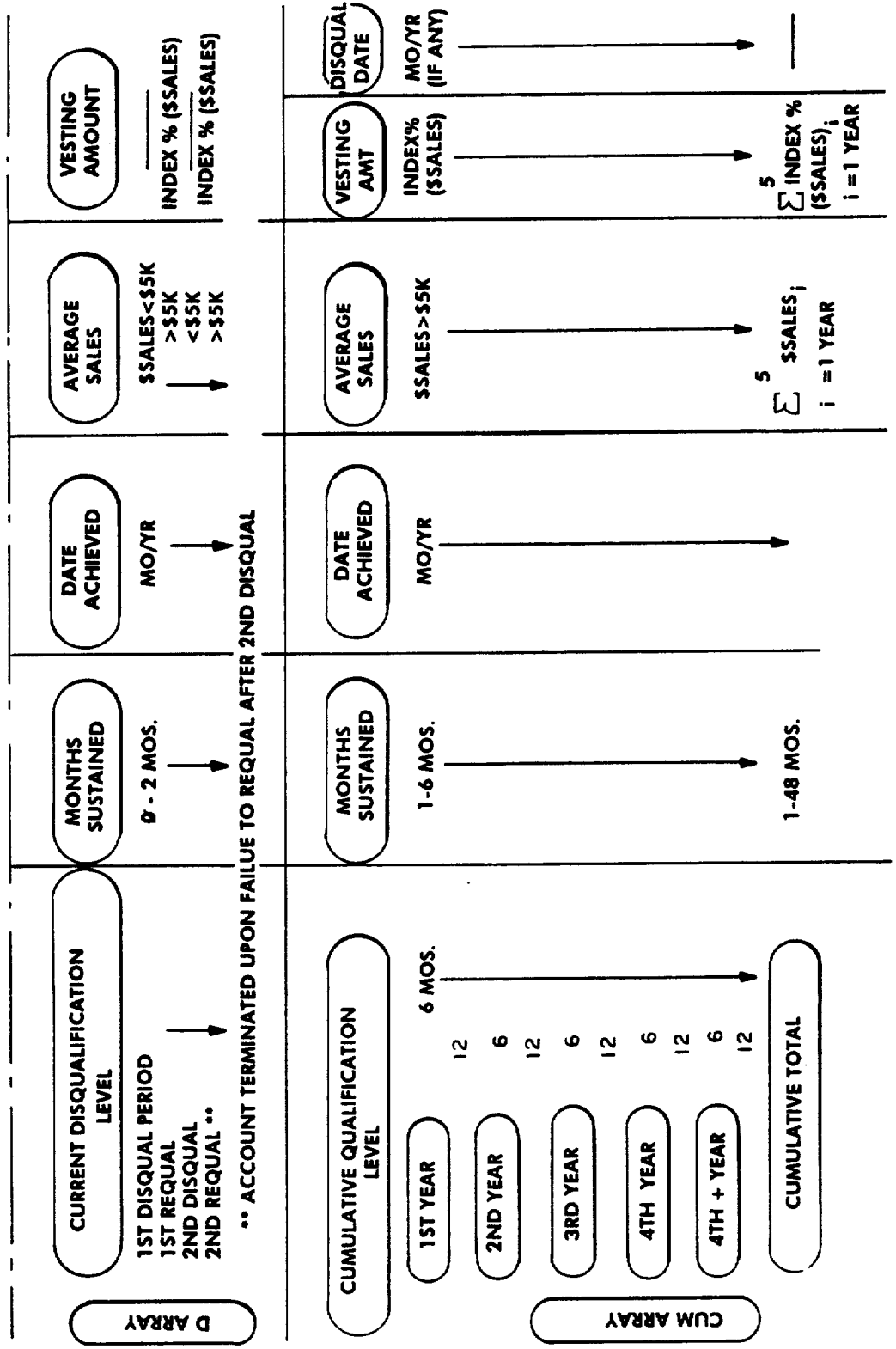

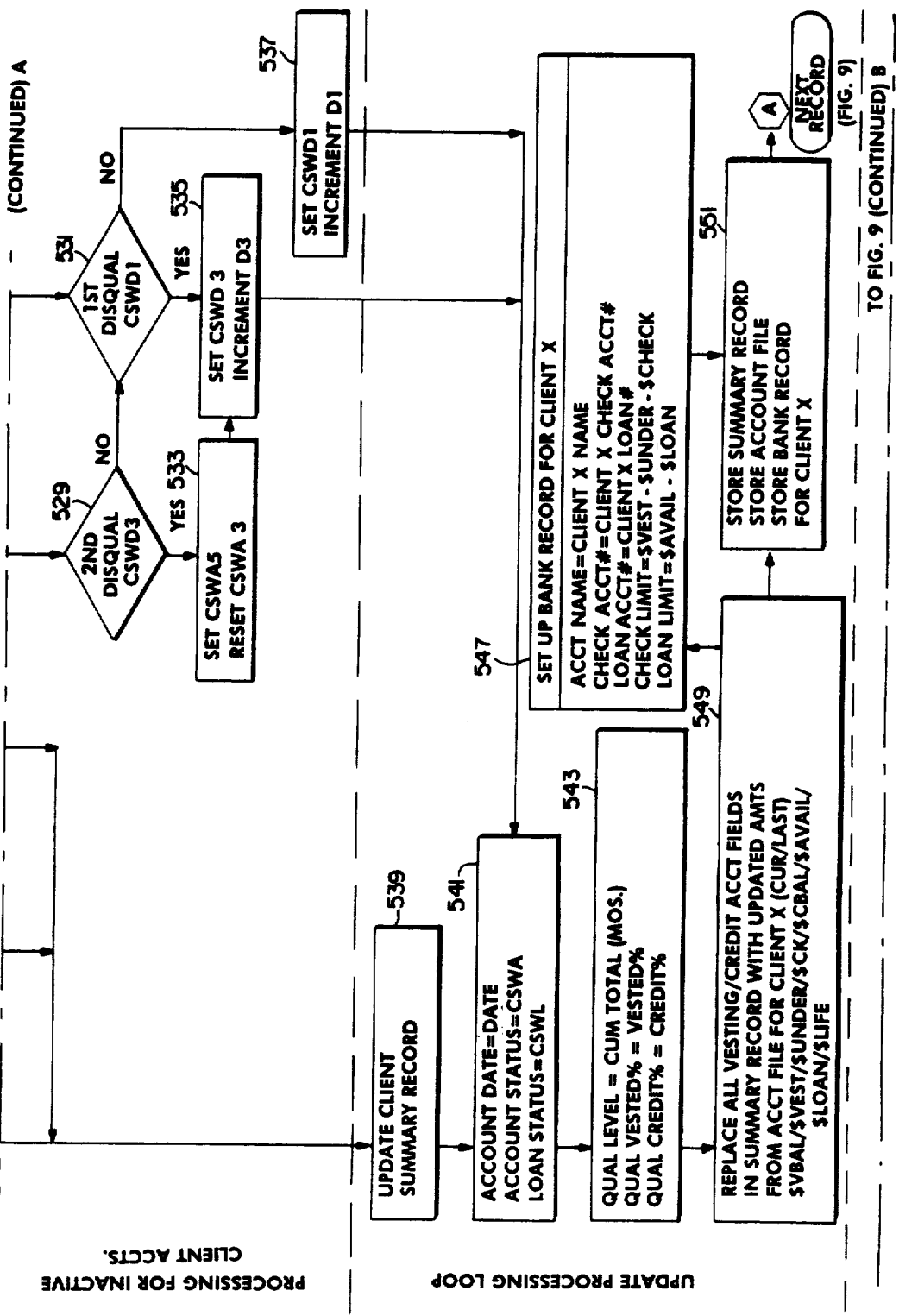
FIG. 9 (CONTINUED) A

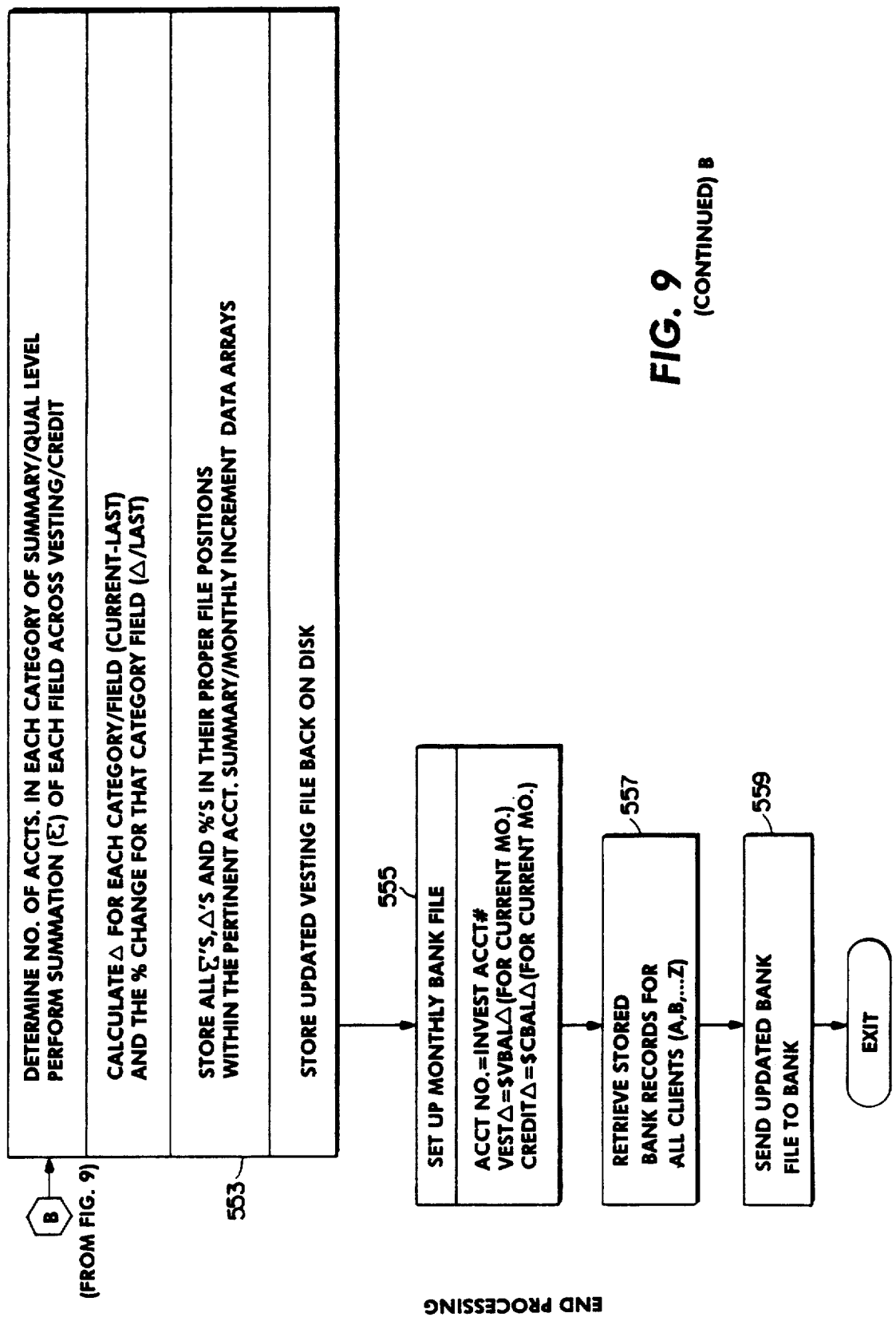
FIG. 9 (CONTINUED) B

4,994,964

TRANSACTION TRACKING DATA PROCESSING SYSTEM

FIELD OF THE INVENTION

The invention generally relates to an improved data processing system for business and financial management. More particularly, the invention relates to a data processing system which uniquely monitors business order transactions over time and the status of funds deposited into special accounts set up for the benefit of qualifying clients.

BACKGROUND AND SUMMARY OF THE INVENTION

Prior art financial management data processing systems are typically first utilized when a client delivers funds to invest. For example, the securities brokerage-cash management system described in U.S. Pat. No. 4,346,442, while monitoring and controlling a wide range of investments, is concerned solely with a data processing system whose action is initiated when an investor directs funds to the cash management system.

The present invention, besides operating in a manner totally distinct from the system described in U.S. Pat. No. 4,346,442, uniquely combines data processing activities that are not normally associated with each other. More specifically, the present invention monitors business orders from participating clients. In addition, the system monitors each client's performance over time based upon predetermined criteria in order to determine the client's vested interest in funds deposited into client "vesting" and "credit" accounts.

The monitored business order data is stored on disk in specially formatted client account files. In addition a unique vesting account file is stored which includes summary data encompassing all the client files.

For clients who exceed the predetermined criteria, the data processing system keeps track of incrementally rising vesting rights and other benefits each participating client receives with respect to each account. Upon meeting the predetermined criteria, 100% of the funds in the "vesting" account can become the property of the client. The "vesting" account also carries with it check writing and undersale privileges.

In addition, for clients who exceed a predetermined level of goods purchased over time, a "credit" account is set up which carries both a life insurance benefit and an incrementally rising line of credit. With respect to the line of credit, if a client's line of credit exceeds a client loan request, the loan is granted and loan processing papers are automatically generated by the system.

The vesting rights associated with these accounts accrue automatically without any action required by the client other than the continuation of normal business transactions. The data processing system's ability to track these and many other conditions is enhanced by the specially designed file formats and a unique set of control status words which control software flow and which are utilized to visually flag important statuses.

BRIEF DESCRIPTION OF THE DRAWINGS

These as well as other features of this invention will be better appreciated by reading the following detailed description of a presently preferred exemplary embodiment taken in conjunction with the accompanying drawings of which:

FIG. 4 is a representation of an exemplary client account file format;

DETAILED DESCRIPTION

Figure 1:
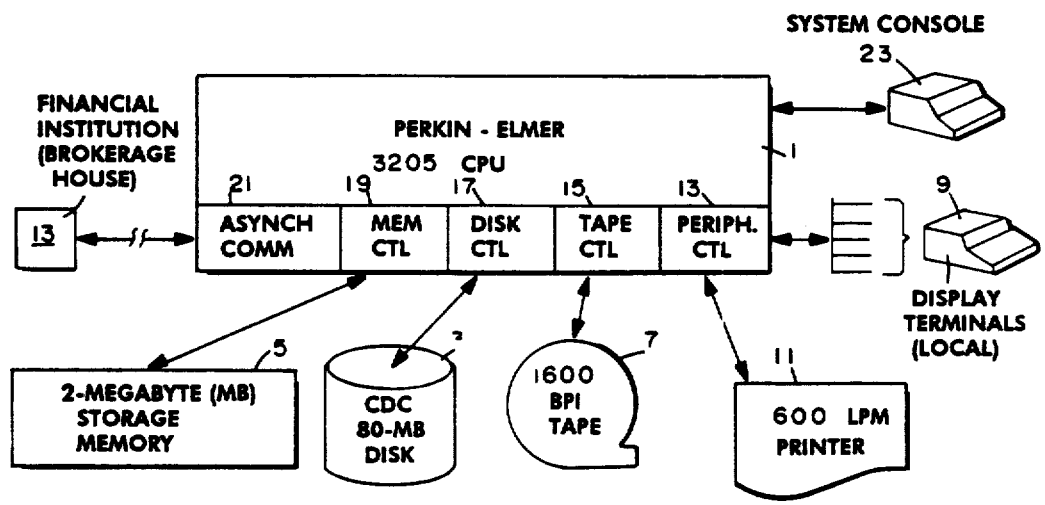
FIG. 1 is a schematic diagram of the hardware elements in the data processing system of the present invention.

Turning first to the hardware elements of the data processing system of the present invention, the heart of the system is the Perkin-Elmer 3205 CPU 1. This minicomputer is powerful enough to perform the regular day to day business data processing tasks of, for example, a large business forms manufacturing and sales corporation, while also performing the unique data processing operations characteristic of the present invention.

The CPU creates the unique client data files, as will be explained in detail below, and stores such data files in the Control Data Corporation (CDC) 80-megabyte (MB) disk 3. Disk 3 also stores the client business orders and other related data entered during the normal course of business. The programs controlling the CPU operation are likewise stored in the disk 3. These programs are selectively retrieved and executed to accomplish the account management tasks of the present invention on a periodic time basis (e.g., monthly "batch" processing) and on an event-driven demand basis (e.g., client loan request).

The 2-megabyte main storage device 5 is utilized by CPU 1 via memory controller 19, as will be appreciated by those skilled in the art, for executing such control programs relating to file updating, loan request processing, status inquiries, etc. The tape unit 7 serves as a backup memory device which, under the control of CPU 1 via tape controller 15, is used to preserve contents of the disk in case of a disk head "crash", an extreme power surge, or other source of disk failure.

The system includes display terminals 9 which allow authorized personnel to interrogate the system as status inquiries, and to initiate a wide variety of processing functions, from initiating loan requests to updating client and vesting files. The format of the display screens are structured to correspond with the account file format in disk 3.

The system also includes a printer 11. The CPU 1 interfaces with display terminals 9 and printer 11 via a conventional peripheral controller 13. The printer 11 is a 600 lines per minute printer for printing outputs from the system such as periodic monthly statements, hard copies of status inquiries, and authorized loan papers, as will be discussed below.

The data processing system of the present invention further communicates with a financial institution 13, which may be a bank, brokerage house, or the like. This financial institution includes a computer which receives and monitors vesting and credit data for each client enrolled in the program. These accounts may either be monitored by the financial institution on an individual client basis or, preferably, on a collective basis with a single vesting account and credit account for all participants in the program. The nature of such accounts will be explained below.

By only using two collective accounts, the financial institution need only receive funds covering the total amounts to be invested. The CPU 1 would then receive from the bank, statements reflecting, for example, the current total amount of funds in the accounts and the rate of return or growth in the investment base. The financial institution's computer communicates with the local CPU 1 on an asynchronous, i.e., event driven, basis to transmit such accounting statements. Communication with CPU 1 is accomplished via the CPU asynchronous communication interface 15 in a conventional manner.

As will be appreciated by those skilled in the art, CPU 1 and the other system components operate under the control of a system console 23. The system console determines which devices are actively operating in the data processing system and is under local operator control at the site of the CPU.

Before discussing the details of the software which controls the data processing system of FIG. 1, the nature of the transactions which the system is responsible for monitoring and controlling is explained below in conjunction with FIG. 2. As noted above, the data processing performed by the present invention operates in consonance with the data processing associated with normal business operations. To avoid obscuring the present invention such normal data processing activities will only be generally described.

Figure 2:
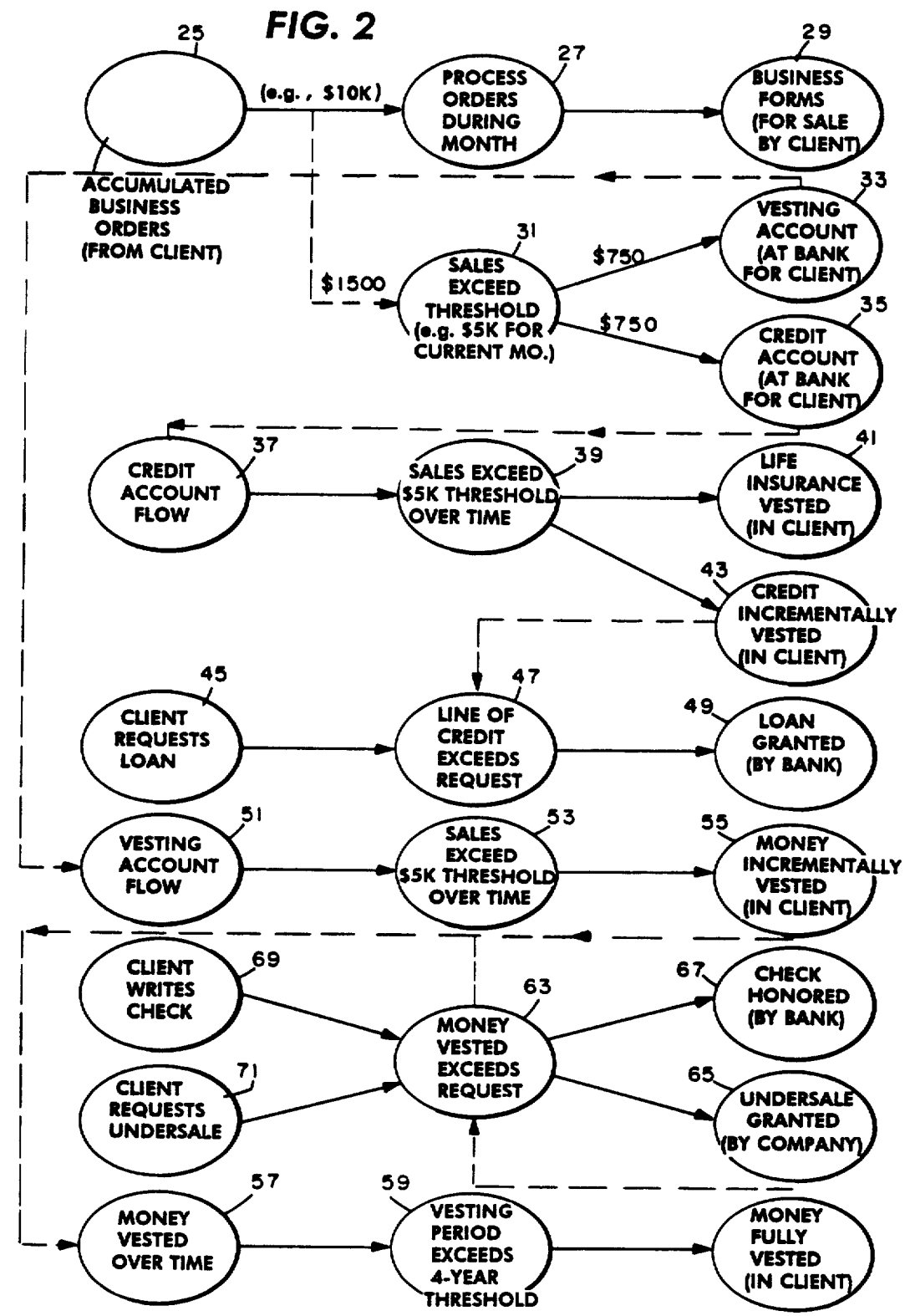
FIG. 2 is a schematic diagram depicting the transactions which the data processing system of the present invention controls and monitors.

FIG. 2 shows that, as business orders are received from clients, they are accumulated (25) and processed (27). The nature of the processing will of course vary depending upon the nature of the business. By way of example only, the business will be presumed to relate to the production of business forms. Thus, the culmination of customer order processing results in business forms being delivered to the customer.

The data processing system of the present invention is directed to processing and monitoring the transactions associated with those customers who desire to participate in, and qualify for, the program to be described below. The present invention monitors client's orders to determine those clients who exceed a predetermined threshold of average monthly sales (e.g., $5,000 denoted hereinafter as $5K).

By way of example only, if a client's monthly accumulation of business orders exceeds the predetermined threshold, a predetermined percentage (e.g., 15% to 40%) of the order sales price is diverted and split (31) into two accounts, a vesting account (33) and a credit account (35). The vesting account may potentially become 100% vested to a qualifying program participant. The credit account, on the other hand, is funded by the business form company and remains the company's property. The credit account, however, has associated benefits for the client in the form of credit and life insurance. It is contemplated by the present invention that these accounts may either be bank accounts, money market accounts, or more varied investment accounts at a brokerage house.

As indicated above, different benefits flow from the credit account and the vesting account. Turning first to the credit account (37), for customers who exceed a predetermined level of goods (39) purchased over time, (e.g., $5K per month) such customers receive both a life insurance benefit (41) and an incrementally rising line of credit (43). With respect to the line of credit, if a customer's line of credit 47 exceeds a customer loan request 45, the loan is granted and loan processing papers are automatically generated by the system (49).

With respect to the vesting account flow (51), for clients whose purchases exceed a predetermined level (53) over time, (e.g., $5K per month) a predetermined percentage of sales incrementally vests to the client (55). That is, in time, upon meeting the criteria to be discussed below, 100% of the funds in the vesting account become the "fully vested" property of the customer 57, 59, 61.

The vesting account carries with it check writing and undersale privileges. As the vested percentage increases over time, the check writing and undersale privileges also increase. An undersale refers to a client purchasing the company's product for less than the company's current sales price. As long as the funds currently vested to the client (63) exceed the total checks already drawn by the client on the vesting account (or exceed the difference between the current sales amount vested and the total undersales already granted), a new check will be honored by the bank (67) (or a new undersale will be granted by the company (65)) against the remaining available balance in the vesting account.

Figure 3:
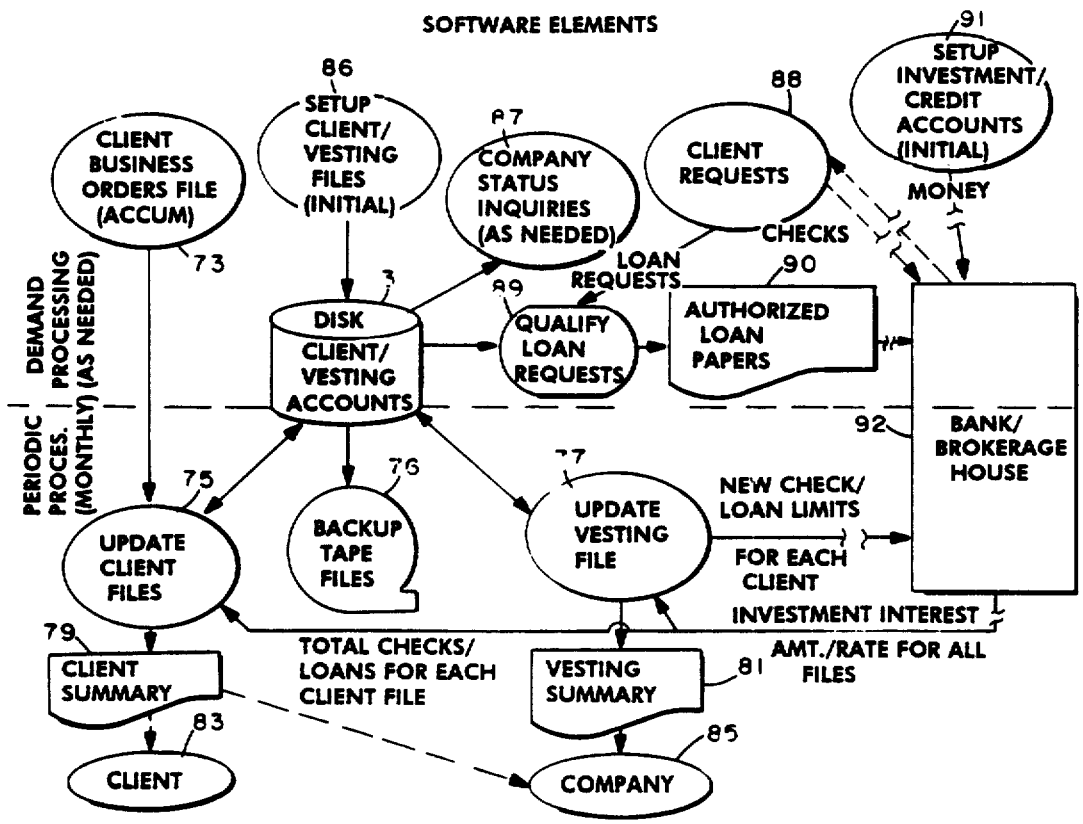
FIG. 3 is a schematic diagram of a system including the software elements of the present invention.

FIG. 3 is a schematic block diagram of a system including the software elements necessary to control the computer system shown in FIG. 1 to implement the present invention. The elements shown above the dotted line are event driven and function to initially enter or later interrogate data in the system, as needed, on demand. The elements below the dotted line process data thus entered on a periodic basis (e.g., daily, weekly, monthly) to repetitively perform predetermined tasks.

As indicated at block 73 in FIG. 3, client business orders are accumulated and stored during the normal course of business in files on disk 3. Such client order files in disk 3 would typically be accessed and maintained by business management software, e.g., for inventory control, which otherwise has no relationship to the present invention. The stored client business orders are input, for example, on a monthly basis to the update client file routine 75. All of the client files, as well as the vesting files, are resident in the disk 3 (and are also stored on backup tape 7 upon completion of the monthly update cycle).

Once the client files are updated, then the vesting file is updated by the update vesting file routine 77. The update client files and the update vesting file routines 75, 77 generate periodic client account and vesting account summary sheets 79, 81, respectively, on printer 11. These summary sheets may be viewed at any time on any of the local display terminals g by an authorized user, e.g., as a status inquiry 87. The display screen format and the printed summary sheet format correspond field-by-field to the disk file format which will be discussed in detail in conjunction with FIGS. 4 and 6. The client account summary sheet is transmitted to the client 83 and the company 85, while the vesting account summary sheet, which has more sensitive financial data, is transmitted solely to the company.

In order to initially set up client and vesting files (86), all that needs to be manually entered is the name, address, and account number of an initial set of program participating clients. The system, as will be explained below, constructs the files with only a minimal amount of input information.

The status inquiry element (87) permits company management to, for example, monitor the financial status of the transaction tracking and investment program. A management official merely needs to access the vesting file (described in detail with respect to FIG. 6) to be informed at a glance of a wide range of data indicative of the current financial program status. At the same time, individual client data also is provided so that an individual client account file may be accessed by a display terminal operator in response to an individual client account status inquiry 87.

The client, as shown at 88, may initiate loan requests, which will be processed by the qualify loan request subroutine (89, 90) as will be discussed below in conjunction with FIG. 7. The client also has check writing privileges on his vesting account limited to the extent of funds vested to him, as will be explained in detail below.

The participating company as shown in block 91 initially sets up investment and credit accounts at a bank or brokerage house 92. These accounts are automatically credited with the proceeds from the investments. Each month a predetermined percentage of sales are transferred from the company to these accounts. As will be explained in detail below, an incrementally vested portion of the accounts' funds are accessible by qualified clients by exercising check writing and credit line privileges. The accounts are also set up to carry life insurance benefits.

The bank (or brokerage house) is notified by the update vesting file routine 77 of new check and loan limits for each client, based on the client's business order activity for the current month. In turn, the bank supplies the update vesting file routine 77 and the update client file routine 75 with data regarding the investment rate of return. Additionally, the update client file routine 75 is provided with the total checks and loans honored by the bank for each client file for the preceding periodic cycle (e.g., month).

As noted above, the account summaries, which are transmitted to the company and/or the client are stored on disk 3 in a format corresponding basically to the display or printer output format seen by the user. Turning first to the FIG. 4 client accounts format, the format headings are shown in the top left-hand portion and are: REPORT, CLIENT, STATUS, RATES and BALANCE. The fields to the right of these headings are labeled in an essentially self-explanatory fashion (except as explained below) to reflect the data which must be associated therewith. It should be noted here that many variations in disk data storage format from the alphanumeric display format shown (e.g., logical bit-encoded status words (CSW's)) are contemplated by the present invention.

With respect to the REPORT heading in the field "TITLE", "CLIENT ACCOUNT FORMAT" would be inserted. The LEVEL field relates to the client's achieved qualification level, where CUMX and QX indicate the level in the CUM array and Q array that the client has respectively achieved. The manner in which data is entered in these FIG. 4 arrays will be explained below.

The first field in the CLIENT heading, the account number, is utilized by the system software to access the client file. Below the client information, the client account format uniquely provides the client with the control states of control status words which reflect the client's current status as defined by ACCOUNT, VESTED, QUALIFIED, DISQUALIFIED, LOAN, and ERROR control status words. The meaning and significance of these status words will be explained in detail below.

With respect to the RATES heading, the VESTED% and the CREDIT% reflect the percentage of the vesting and credit accounts which the client has a vested interest. By way of example only, the specified percentages and the associated timeframe at which the percentages are incrementally raised are shown in the qualification schedule shown in Table 1 below. If desired, the percentage and/or the period of time to achieve a particular vesting or credit percentage may be changed from that shown in the table, at the discretion of the host company. Thus, it is within the scope of the present invention to change any of the percentages and/or timeframes shown below (for example, to extend the period of 100% vesting from four years to 20 years).

TABLE 1

| QUALIFICATION SCHEDULE | | |
| --- | --- | --- |
| LEVEL | % VESTED | % CREDIT |
| 1 year | 0% | 50% |
| 1-2 years | 25% | 75% |
| 2-3 years | 50% | 80% |
| 3-4 years | 75% | 80% |
| 4 years | 100% | 80% |

The index rate field reflects the percentage of the client's total sales which are targeted for the vesting account and the credit account. The rate of return or percentage growth of funds placed into an account is listed based on the current month and the previous month's growth along with year-to-date (YTD) minimum and maximum percentages.

The BALANCE heading includes fields showing current and last month balance totals in dollars for both the vesting account and the credit account. The subheadings under the VESTING and CREDIT accounts are largely self-explanatory. With respect to the VESTING account balance data, the $VBAL field reflects the total dollars in the vesting account which the company is holding for the client, all of which may eventually be vested in the client. The $VEST field reflects the total dollar amount which is currently vested in the client. The $UNDER field reflects the cumulative dollars advanced to the client to enable undersale purchases to be made. Funds for such purchases are offset against the vested dollars.

With respect to the CREDIT account balance data, it should be noted that the credit account is set up by the company solely for the purpose of providing collateral so that the client may borrow funds from the available line of credit in his account, based on the qualification schedule in Table 1. Additionally, a life insurance benefit is associated with the credit account. However, as with any credit mechanism, the client must pay funds back which are loaned from this account and never actually receives the proceeds from this account.

$CBAL refers to the cumulative total balance in the credit account that may eventually be vested in the client. $AVAIL refers to the current amount of $CBAL that is vested in him, that may be borrowed against his available line of credit. $LOAN is the current total of all loans outstanding against $AVAIL. $LIFE is the cumulative amount set aside by the company for life insurance on the client.

In the Client Account format below the BALANCE heading, data reflecting the client's Current Qualification level, Current Disqualification level and Cumulative Qualification level is stored. These levels determine the client's qualification status for program benefits as just described above.

The purpose of such qualification criteria is to encourage sustained levels of client orders at a threshold above a predetermined amount (e.g., $5,000 per month average) for at least a predetermined period of time (e.g., at least 6 months intervals and bimonthly within those intervals). Thus, by way of example only, a client will reach the qualification threshold (QT) for the program if and only if:

$$QT = \frac{1}{X} \sum_{i=0}^{X} (Y_i - 5000) \, 0,$$

where X is the number of months and Y is the client's order amount during month i. The continuous years which a client remains qualified governs the percentage of the vesting account which vests in the client and the percentage of the credit account which may be borrowed in accordance with the schedule shown in TABLE 1.

Figure 5:
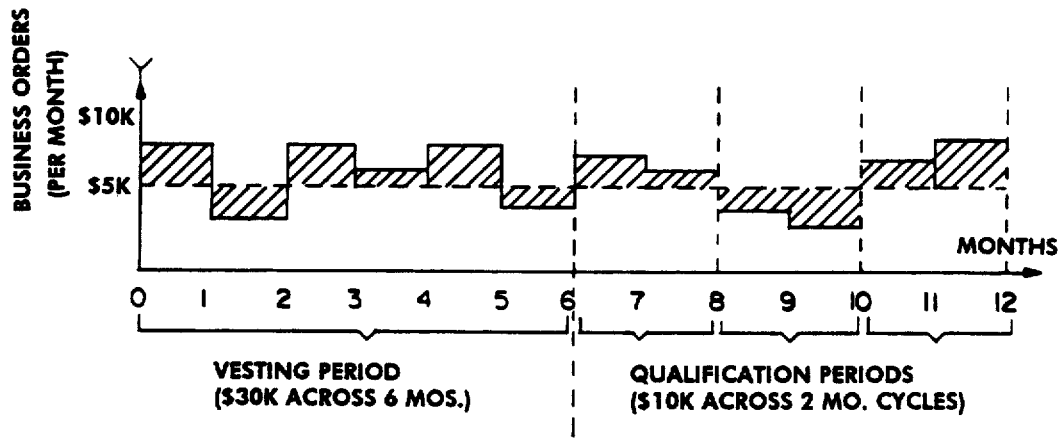
FIG. 5 is a graphic representation of an exemplary client's sales performance to demonstrate the business order monitoring of the present invention.

FIG. 5 graphically portrays how a client's performance would be monitored by the data processing system of the present invention to determine the client's program qualification status over time. In this example, the client "qualified" in months 1-6 for VESTMENT, "qualified" again in months 7-8 (1st period of next VESTING period), "disqualified" in months 9-10 (2nd period of VESTING period), and "requalified" in months 11-12 (1st period of new VESTING period) to begin a new six-month VESTING period (since months 1-6 succeeding at qualifying a first VESTING period). The net effect of disqualifying/requalifying is merely to delay start of the next six month VESTING period (e.g., by 4 months MAX) until three consecutive two-month qualification periods can be established, i.e., all previously VESTED six-month periods remain intact if the client requalifies.

Turning back to the client account format, the current qualification level heading (which is labeled the Q array) shows qualification periods in, for example, two month increments. The qualification periods are listed as periods 1-6 in the left hand column. If, during the first two month qualification subperiod, the average sales was over $5,000 per month, the month and year this was achieved, along with the average sales and the vesting amount (i.e., the funds targeted for the credit and vesting accounts) are listed for the subperiod. The same data is maintained for the second and succeeding two-month periods and an ongoing cumulative listing is stored under the CUMULATIVE QUALIFICATION LEVEL heading shown at the bottom of FIG. 4.

Turning next to the Current Disqualification heading, a non-zero entry, the first disqualification period reflects a client's two-month average orders with the company being less than $5000 per month. In the exemplary embodiment, the system provides for a first and second requalification periods, as well as a second disqualification period which triggers the account to be terminated. The requalification periods permit recovery from disqualification if the monthly average is raised above the predetermined threshold, (e.g., $5000) for the next two-month period.

Thus, to summarize the criteria and qualification periods which the data processing system of the present invention must monitor, the vesting criteria (A) requires that, for each six-month period, orders must exceed an average of $5000 per month. The sustaining criteria (B) requires that, for each successive two months, orders must exceed an average of $5000 per month. For any period in which criteria A and/or B is not met, the client is disqualified from the program for that period. Thereafter, a new VESTING qualification period (under criteria A) is begun once a SUSTAINING qualification period (under criteria B) is successfully maintained. Any year in which criteria A and/or B is not met for a second time results in account termination.

The cumulative qualification level heading provides a client's performance history over a four-year period. The cumulative entries are organized in terms of six-month qualification periods. Once the current six-month qualification period is achieved (as indicated in the Q array), the cumulative totals are entered into the cumulative (CUM) array. After four years ( 48 months) of sustained qualification, the client becomes 100% fully vested (See Table 1). Thus, the cumulative tabulation tracks the client's progress towards achieving total vestment under the program. It should be recognized that the disqualification, requalification, and termination criteria are arbitrary standards which may be changed as desired. Such criteria, however, does provide a mechanism for exercising control over the number of clients allowed to continue participation in the program.

Figure 6:
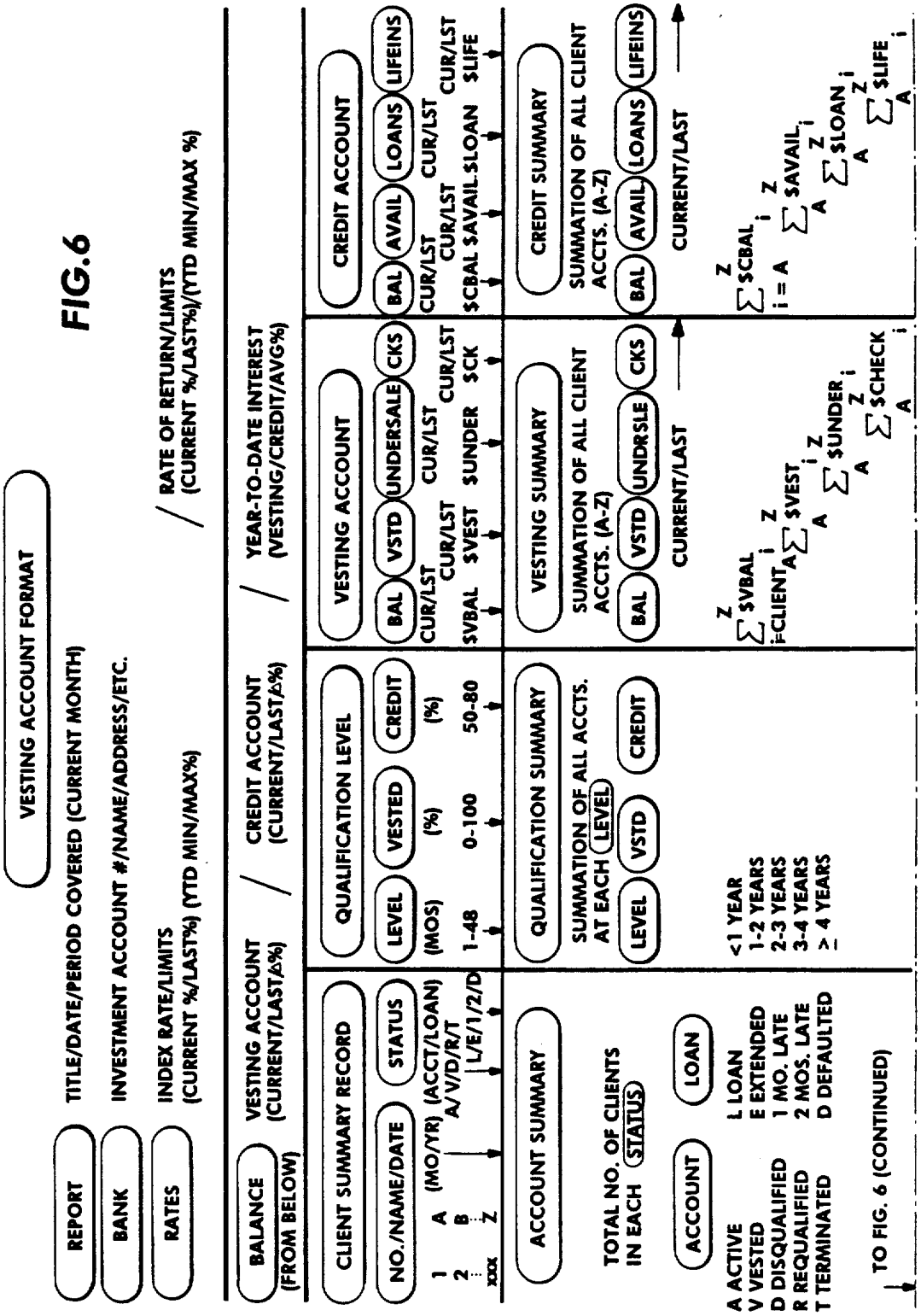
FIG. 6 is a representation of an exemplary vesting account file format.
Figure 6:
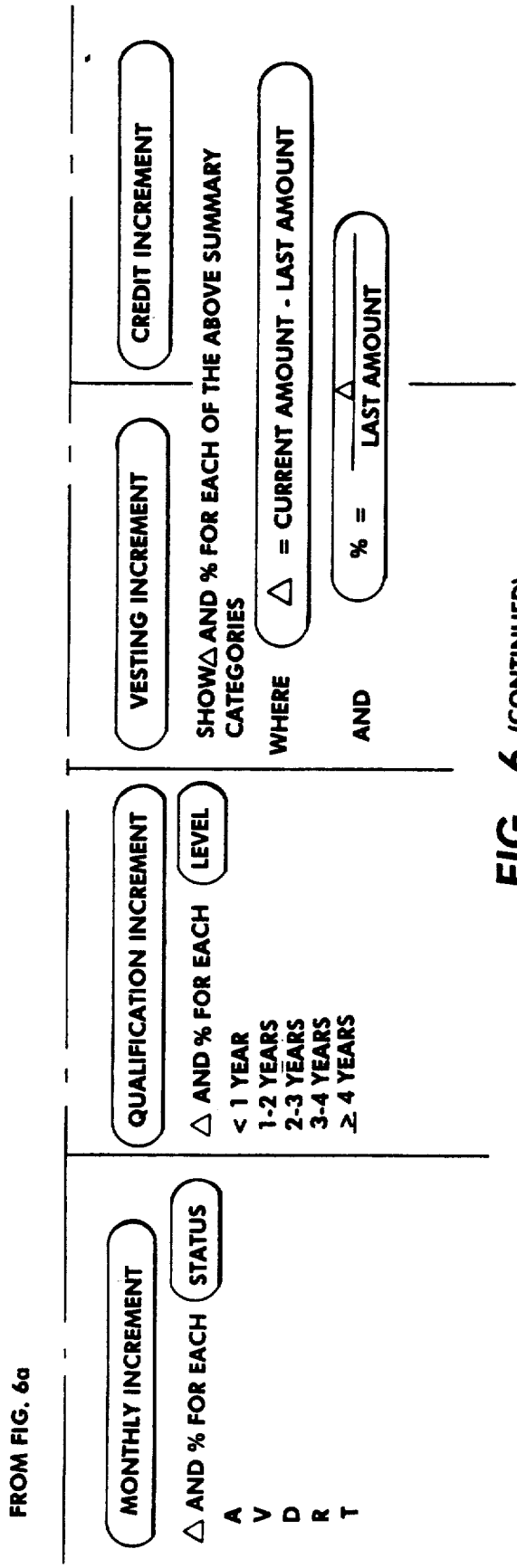

The vesting account file format is shown in FIG. 6. This file reflects cumulative statistics for all clients who are participants in the program. The REPORT, BANK, RATES and BALANCE headings contain fields which are largely self-explanatory. The BANK (or investment or brokerage house) heading provides for the entry of an account number associated with all the funds in the program. The RATES heading includes an INDEX RATE field which is designed for the entry of the percentage of all sales which is being diverted into this program.

The Rate of Return identifies the percentage growth of all funds placed in the investment account. It is contemplated that the investment account may be a multi-faceted investment plan including money market, corporate and government bonds, and secure capital stock mutual funds. The LIMITS field denotes the minimum and maximum percentage return for the current month. The BALANCE heading includes fields for overall VESTING ACCOUNT and CREDIT ACCOUNT balances for the current month, previous month, and the percentage change (as determined by the ratio of the current month to the previous month). The data for the previous month in this field and many of the other fields is shown in FIG. 6. The fields listed under the BALANCE heading (e.g., $VBAL, $VEST, 111, $LOAN, $LIFE) are identical to the same fields within the CLIENT ACCOUNT format shown in FIG. 4.

Turning to the client summary record shown in FIG. 6, all the clients in the program are listed by number and name. The date of the last transaction is listed, as well as the status of the vesting account and the credit account. The status of the VESTING ACCOUNT reflects whether it is currently active (A), vested (V), disqualified (D), requalified (R) or terminated (T) as discussed above. The status of the CREDIT (or loan) ACCOUNT reflects whether it currently has a loan (L), loan extended (E), 1 month late (1), 2 month late (2), or defaulted (D) status.

The QUALIFICATION LEVEL, VESTING ACCOUNT and CREDIT ACCOUNT headings are filled in during an update cycle to be described below by transferring current balances from the individual client account summaries produced from the balance entries in FIG. 4 for the same categories as discussed above. In regard to the QUALIFICATION LEVEL entries, it is noted that the level entry is received from the individual client account format which was discussed above. The percentage vested in the VESTING ACCOUNT (i.e., 0-100%) and the CREDIT ACCOUNT (i.e., 50-80%) are determined by retrieving the appropriate percentages from a stored schedule corresponding to Table 1.

As shown in the VESTING ACCOUNT file format, the ACCOUNT SUMMARY heading reflects the total number of clients in each status. Additionally, the QUALIFICATION SUMMARY shows the total number of accounts in the various stages of vestment under both the vested account and credit account categories. The VESTING and CREDIT summary simply record the totals for all clients A, B, . . . , Z for the entries discussed with respect to the vesting and credit account headings.

The bottom portion of the vesting account file format shown in FIG. 6 records the changes (Δ's) over the previous months entry in the categories immediately above in the format. The change (Δ) is recorded both in term of the current amount minus the net amount and well as the percentage increase (or decrease) over the preceding month. If desired, year-to-date totals may likewise be generated for each of the categories in the vesting account format.

Before turning to the flowcharts, it is noted that the flow of program control centers around the control states of a unique set of control status words which are listed in Table 2 below.

to CSWV upon reaching the sixth two-month period (CSWQ bit 6 set) signifying a full year of qualification.

For CSWA to advance to "vested" (bit 2 set), then CSWV must have advanced sequentially to the fourth year of qualification (CSWV bit 4 set) by four successive "overflows" from CSWQ.

For CSWA to revert to "disqualified" (bit 3 set), then the client is in the process of being disqualified for the first or second time during the current year, as reflected by CSWD (bit 1 or bit 3, respectively).

For CSWA to advance to "requalified" (bit 4 set), then the client is attempting to requalify for the first or second time after a disqualification, as reflected by CSWD (bit 2 or bit 4, respectively).

For CSWA to revert to "terminated" (bit 5 set), then the client must have passed through his second disqualification (CSWD bit 3 set and reset) without successfully requalifying (CSWD bit 4 set and reset) leading to "terminated" state in CSWD (bit 5 set).

From the above discussion, it can be seen that CSWA, the CSW controlling overall program flow can be in one and only one state at any given time (i.e., its CSW states are mutually exclusive). Hence, this CSW can be easily tested for its current value by simply testing for one of 6 discrete values (e.g., binary "bit" positions 1, 2, 3, 4, 5, 6, corresponding to decimal values 1, 2, 4, 8, 16, 32).

On the other hand, CSWQ, simply advances sequentially from the first period to the sixth period of QUALIFICATION. Each bit position (1, 2, . . . , 6) represents completion of the second month of the corresponding period (1, 2, . . . , 6). Thus, CSWQ bit 6 (set)would indicate completion of a full year of qualification and likewise CSWV bit 2 (set) would indicate completion of the second of four years required for full VESTING. For CSWA to advance to "reinstated" (bit 6 set), then the client must have reopened his account by requalifying as if he were a new customer (hence, the old account number will be closed and a new one opened).

In a similar, but nonsequential manner, CSWL represents the status of a client's loan which can have multiple states at the same time e.g., loan outstanding (bit 1), loan extended beyond limit (bit 2), loan 2 months late (bit 4)), which may all be set at once. The above arrangement for a "bit-position" CSW preserves the capability of tracking these independent, but concurrent, statuses within a single CSW word (or even a single byte for that matter).

TABLE 2

| Bit Position (all bits off) | CSWA ACCOUNT A (not yet active) | CSWV VESTED F (0 yr.) | CSWQ QUAL. Q (0 mo.) | CSWD DISQUAL. D (0 mo.) | CSWL LOAN L (0 loans) | CSWE ERROR E (0 errors) |
|---|---|---|---|---|---|---|
| Bit 1 | Active undersales over limit | 1st yr. | 1st per. | 1st disq. | loan | |
| Bit 2 | Vested overdrawn | 2nd yr. | 2nd per. | 1st requal. | extended | checks |
| Bit 3 | Disqual. over limit | 3rd yr. | 3rd per. | 2nd disqual. | 1 mo. late | loans |
| Bit 4 | Requal. request rejected | 4th yr. | 4th per. | 2nd requal. | 2 mo. late | loan |
| Bit 5 | Termn't. | 4th yr. | 5th per. | | defaulted | |
| Bit 6 | Reinstd. | | 6th per. | | judgment | |

The relationship between these CSW's is as follows:

If CSWA is "active" (bit 1 set), then CSWV and CSWQ reveal the current qualification level (in years and months respectively), with CSWQ "overflowing"

Thus, CSWD and CSWL can be tested by examining individual bit positions for exact status, or can be tested for a single decimal threshold value to quickly determine general "warning" states to deny a future loan request (e.g., CSWL>3 indicating late payment or loan default). The remaining CSW's can likewise be tested for exact states by bit position, or for a single decimal threshold to determine general "warning" states that can be used to deny check writing or undersale privileges (e.g., CSWD>0 or CSWA >3 indicating that the client has not yet requalified after a disqualification).

Finally, CSWE "flags" any improper account balance uncovered during the periodic or demand processing for later analysis and resolution. This CSW is reset each month but, if the error condition persists, it is again "flagged" for attention. It can be readily interrogated upon status inquiries to "flag" an operator about an "out-of-bounds" condition that may require notification to the customer.

Thus, these CSW's may be strategically used not only to quickly and conveniently control intrinsic program flow and calculations, but also to visually "flag" important statuses that may influence an inquiring loan officer to deny a privilege or perhaps to override a programmed credit denial decision.

The detailed flowcharts which follow delineates the sequence of operations performed by the data processing system software regarding qualifying clients for loan requests, updating the client files and updating the vesting file. To simplify the amount of text required to describe the logic flow in the flowcharts, the following flowchart function and label conventions have been adopted:

| FLOWCHART FUNCTIONS | |
|---|---|
| "UPDATE" means | current value replaces last value |
| | new value replaces current value |
| and also, for rates, | new value replaces ytd min. |
| | new value replaces ytd max. |
| "INCREMENT" | add 1 to months sustained |
| means (for both Q array and CUM array) | current date replaces date achieved |
| "ADD" means | add AMT to VESTING AMOUNT |
| (for both Q array and CUM array) | add ½ New Sales to Average Sales |
| "ADVANCE" | reset current CSW bit |
| means | set next higher CSW bit |
| CLIENT ACCOUNT FILE LABELS | |
| "Q1-Q6" | refers generally to the six QUALIFICATION LEVELS in the Q array (or, specifically, to the MONTHS SUSTAINED). |
| "QX" | represents an index for accessing the current LEVEL in the Q1-Q6 sequence. |
| "D1-D4" | refers generally to the four DISQUALIFICATIONS LEVELS in the D array (or, specifically, to the MONTHS SUSTAINED) |
| "CUM X" | represents an index for accessing the current CUMULATIVE QUALIFICATION LEVEL in the CUM array. |
| "CUM TOTAL" | refers to the cumulative TOTAL at the bottom of that array (or specifically, to the MONTHS SUSTAINED) |
| "CSWx" | refers to a particular one of the six control status words (CSW's) for each account (CSWA, CSWV, . . ., CSWE). |
| "CSWx1-CSWx6" | refers to the six bit position within a given CSW. |
| "$ LABEL" | refers to a specific field with the name LABEL within the client account or vesting account format. |

Figure 7:
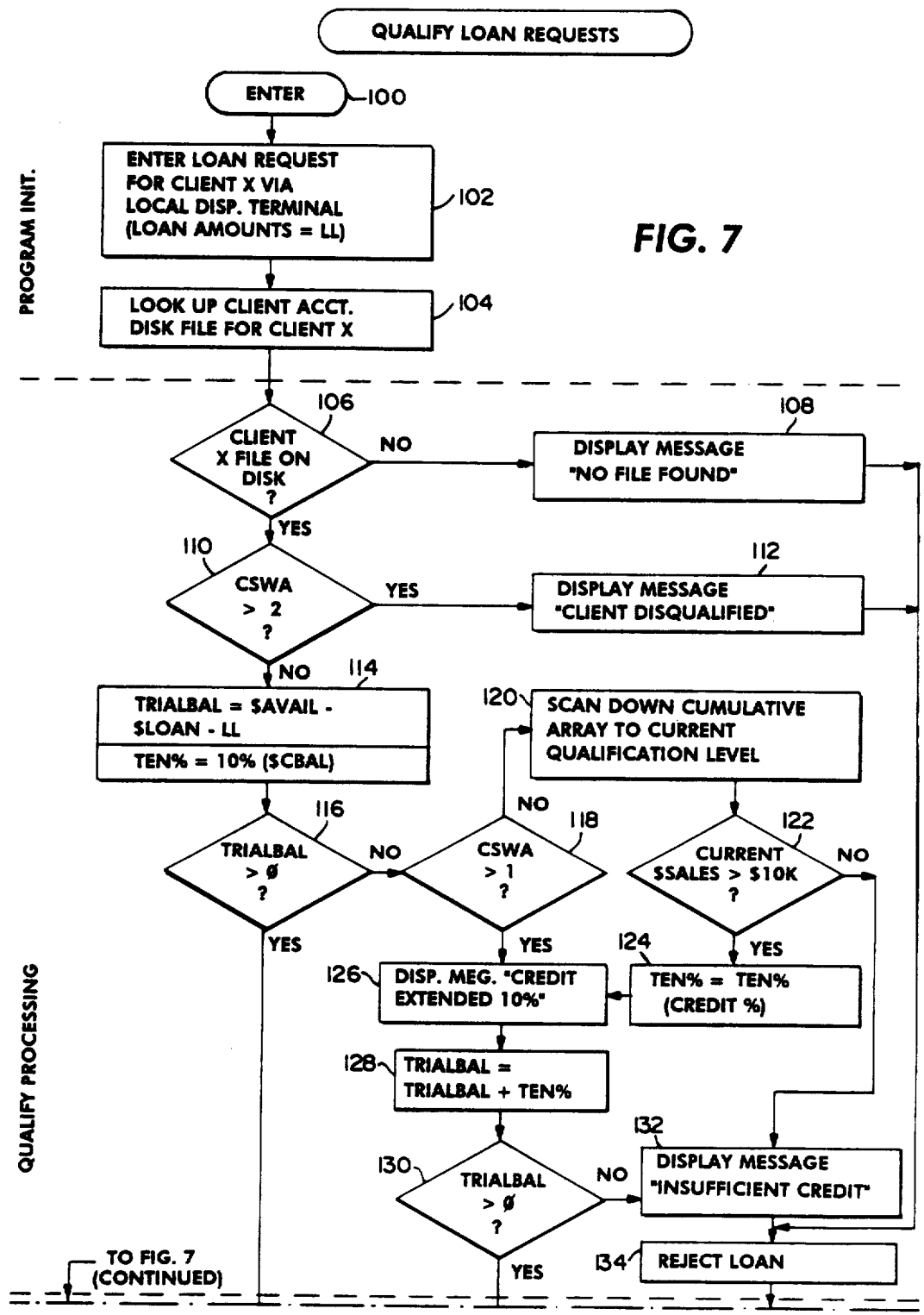
FIG. 7 is a flowchart delineating the sequence of operations performed by the qualify loan requests routine.
Figure 7:
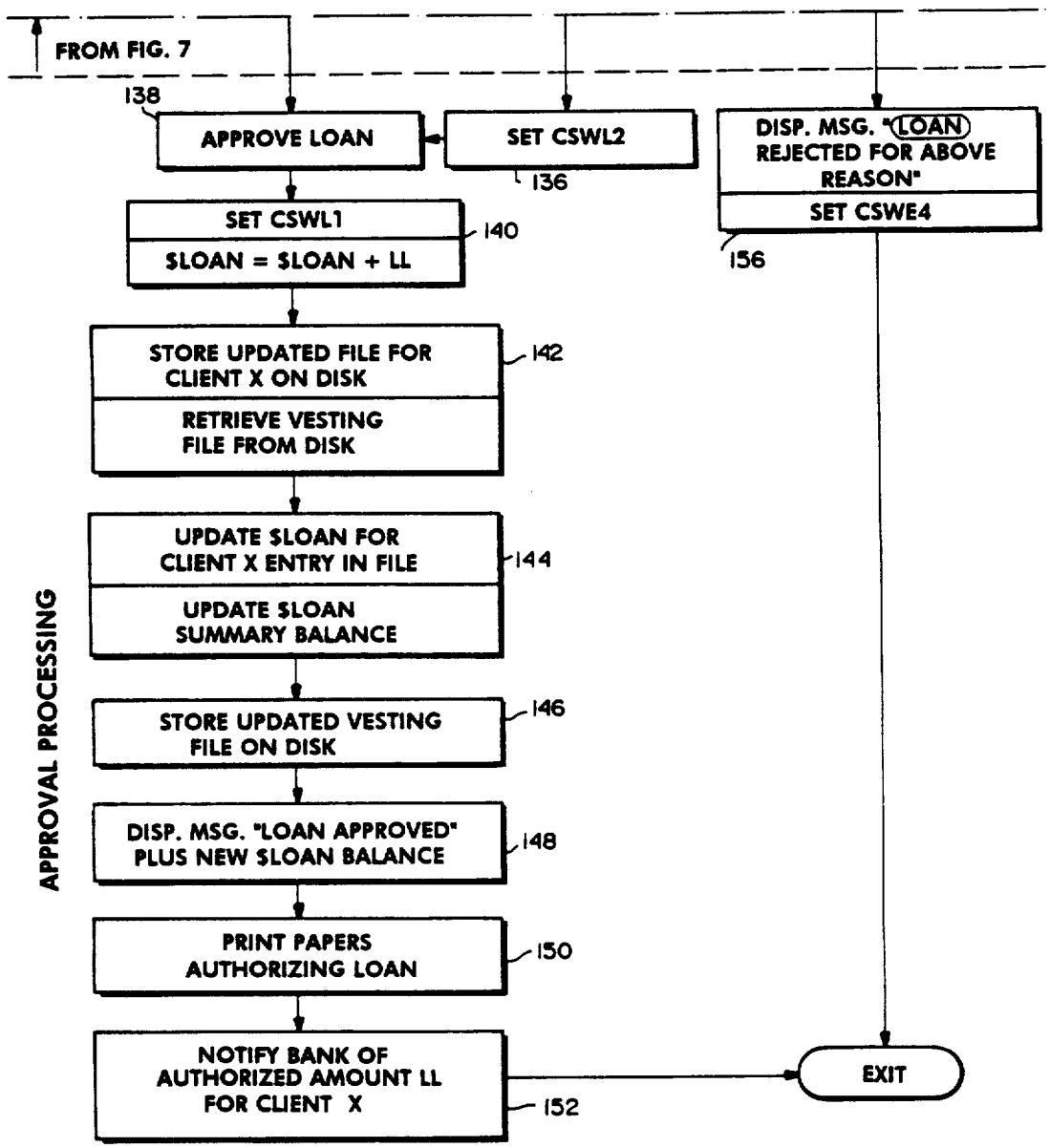

The loan request routine shown in FIG. 7 is initiated by entering a loan request for a specific amount. (e.g., LL, for client X at a local display terminal 9 (100, 102). The disk file is then accessed to retrieve the client account summary for client X (104). If no client account file is stored on the disk then an appropriate error message is displayed on terminal g, e.g., "NO FILE FOUND" (108).

If the client account file is found, then a check is made at block 110 to determine if CSWA is greater than 2 (i.e., indicating one of the disqualified, requalified, terminated or reinstated states). If CSWA is greater than 2, the loan is turned down and a "Client Disqualified" message is displayed at terminal 9 (112). Thus, only clients with an active or vested status are eligible for loans (i.e., CSWA = 1 or 2).

If the client is eligible to receive a loan, then the amount currently requested (LL) and the amount previously borrowed ($LOAN) are subtracted from the current available amount ($AVAIL) that can be borrowed by client X (114). Also in block 114, 10 percent of the credit account balance is calculated for subsequent processing.

If the trial loan balance indicates that too high a loan has been requested, (i.e., the trial balance is less than 0), (116), then CSWA is checked to determine if it is greater than 1 (118). If it is (the client must be vested in view of block 110) then the credit is extended 10% (124). A message is displayed at terminal 9 to reflect the credit extension (126) and the trial loan balance is raised 10% (128).

Next the trial balance is checked to determine if it is greater than zero (130) and, if it is, the loan is approved (138) after setting the control status word CSWL bit 2 (136). If the trial balance is not greater than zero as determined at block 130, then an insufficient credit indication is displayed at the terminal 9 (132) and the loan is rejected (134). As indicated at block 156, a message is then displayed and CSWE bit 4 is set as an error condition.

Turning back to block 118, if CSWA is not greater than 1, then the client account format CUMULATIVE array is scanned to determine the current level of sales (120). If the current months level of sales are high enough, (e.g., greater than 10K (122), then credit may nevertheless be extended even though the client is not yet vested.

If the loan has been approved, the control status word CSWL bit 1 is set and the $LOAN field is increased by LL (140). Next, the updated client X file is stored on disk 3 and the vesting file is retrieved from disk (142). The $LOAN balance for client X and the associated summary balance data is updated in the vesting file (144), after which the updated vesting file is returned to the disk 3 (146). The display terminal 9 then displays a "LOAN APPROVED" message while also indicating the new loan balance (148). Thereafter, the authorized loan papers are printed by printer 11 (150) and the bank is notified of the authorized loan amount for client X (152), at which point the routine is exited.

Focusing on the routine for updating the individual client files shown in FIGS. 8A-8E, this routine is entered and the current month's rate of return is retrieved from the brokerage house or bank 200. Next, the rate of return is compared to a predetermined rate, (e.g., 15%). If the input rate is less than 15%, than a new index percentage of sales to be diverted to the credit and vesting accounts is set to be one half the new rate (204). Otherwise, if the input rate is 15% or greater then the index percentage going to the credit account and the vesting account is set at 7.5% (206). Thereafter the index rate for the entire program is updated (210) and the business orders are sorted by client account number so that they may be processed in ascending sequence by the order processing loop which follows (210).

The business orders accumulated over the prior month are then retrieved from disk 3. From each the business orders, the total sales amount and the undersales amount (if any) is extracted (212). If block 214 indicates that the end of file (EOF) for all business orders have been reached, the current client's orders are then processed. If the EOF has not been reached, the next block 216 determines whether the next order retrieved is from the next client or the current client. If the sale is not from the next client, then a check is made to determine whether an undersale was attached to the business order (218) and if so, the prior undersales total (USALES) is increased by the current undersale amount ($UAMT) (220). Thereafter, the client's new sales amount ($SAMT) is added to his previous sale balance (NEWSALES) (222).

Upon reaching the next client, the complete individual client file processing loop is entered. The loop is initialized by entering the appropriate header information as to the date of last activity, current month index, percentage and rate of return (224).

The amount diverted to the client's account is the index percentage (e.g., 15%) times the new sales amount (226). Next a check is made to insure that the account has not been terminated and, if it has, the end processing loop is entered, as indicated at 229. If the account has not been terminated, CSWA2 is tested to determine if the account is fully vested (230). The client who is fully vested does not need to be tested further in this loop, and so, goes directly to the main file processing loop.

Next, if the new sales are less than a predetermined amount, (e.g., $5K), the disqualifying update routine is called (232, 248). If the sales are equal to or greater than $5K, then CSWA2 is tested (234) as to whether it is greater than 2 (i.e., disqualified, requalified or terminated status), and, if so, exits to the requalifying updating subroutine (250). Otherwise, a "normal" exit is taken to the active updating subroutine (252) (which will be discussed below).

The active updating subroutine returns to the update client file routine at point D, and a test is made for CSWQ greater then zero (236). This single test indicates that the client has reached a new year of vesting and has a fixed predetermined vested interest, which need not be further tested.

On the other hand, if the client has just completed a vesting cycle and is due for a vesting percentage change, then tests must be made to determine the precise percentage to be applied in accordance with the percentage listed as function of qualifying years shown in Table 1. These tests and the associated percentages are shown in blocks 238-244 and 254-262. It is noted that the previously executed active updating routine serves to update the CSWQ's and CSWV's to insure that accurate vesting percentages of, for example, 0, 25, 50 or 75%, are applied to the VESTED ACCOUNT, and 50, 75 or 80% to the CREDIT ACCOUNT.

At this point in the update client files routine, all the variable updating has been completed such that the field requiring particular dollar values may be readily calculated and updated. Thus, turning back to the client account format, all the required account balances are computed, e.g, $CBAL, $AVAIL, $LIFE and updated in the client account file (264). It is noted that the amount dedicated to paying for life insurance premiums may be chosen to be any predetermined desired percentage of the credit account.

Next, all error conditions for the past month are reset (266) and, thereafter, the error conditions are tested and reset for the current month as follows. If the loan balance is grater than the loan amount available (268), an appropriate error message is displayed and CSWE3 is set. If the loan balance is less than the amount available, then a check is made as to whether a new loan status has been received from the bank (e.g., late payment status) (272) and the CSWL is set according to the new status (274).

Thereafter, the client vesting account fields $VBAL, $VEST and $UNDER are calculated and updated (276). $UNDER is then tested to determine whether it is greater than the vested amount $VEST (278) and, if so, an appropriate error message is displayed and CSWE1 is set (280).

Thereafter, a test is made to determine if there are any client checks just honored by the bank during the past month (282). If so, the check balance is retrieved from the bank input and the $CHECK balance is updated by the cash amount paid by the bank (284). Finally, a check is made to determine whether the check balance $CHECK is overdrawn for the current month and if so, an error message is displayed (286, 288).

Figure 8E:
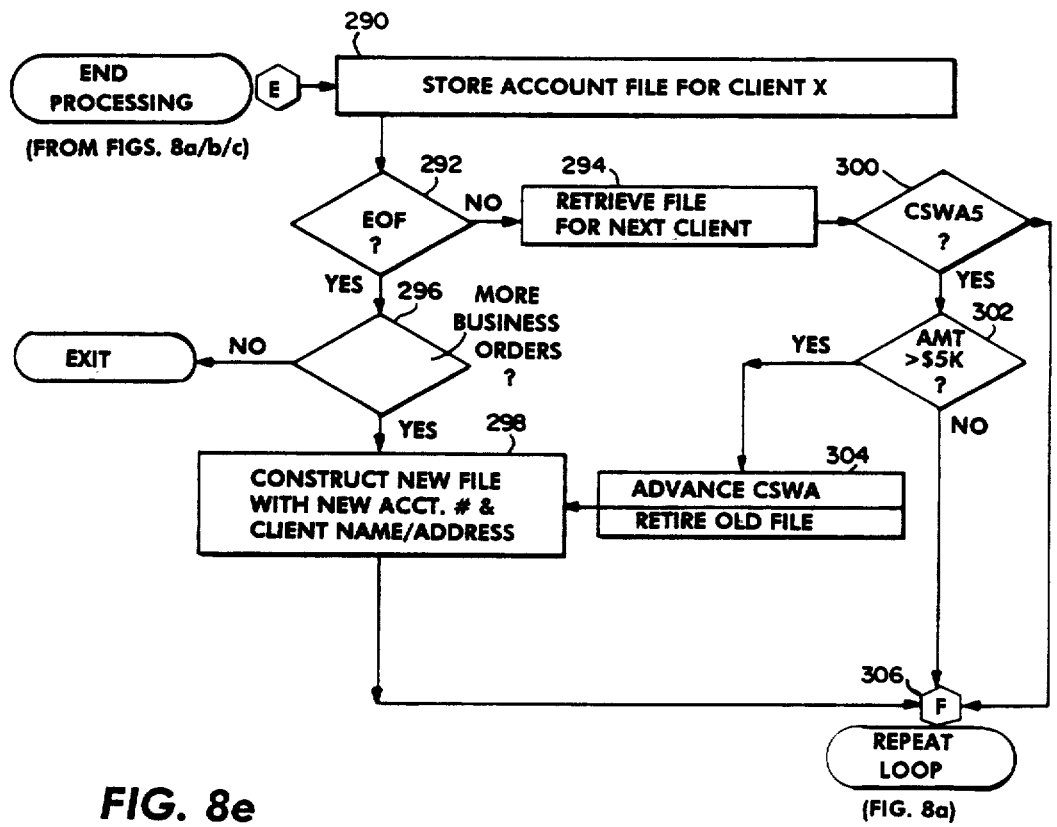
FIGS. 8A–8E are flowcharts delineating the sequence of operations performed by the update client files routine.

The routine end processing is indicated at E and shown in FIG 8E. The account file which has just been updated is stored back onto the disk 3 (290). An EOF test is made for the end of the account file (292). If the end of file has been reached, a check is made to determine whether more orders need to be processed (296). If more orders are present on disk 3, then there must be a new customer at hand, so that a new file must be constructed. The initial loop is reentered at point F (see FIG. 8A), where new sales and undersales are set to zero (246), and the entire process is repeated.

Turning back to the EOF test of block 292, if the end of file has not been reached, then the file for the next client is retrieved (294) and CSWA5 is tested (300). If the client has been terminated, but new orders are coming in which are greater than $5K (302), the old file is retired and the CSWA is advanced to the "reinstated" state (304) and a new file constructed (298). If CSWA5 is off or the order amount is less than $5K, then the initial loop is reentered at point F in FIG. 8A, and the entire process is repeated for the next client in the input sequence.

Figure 8A:
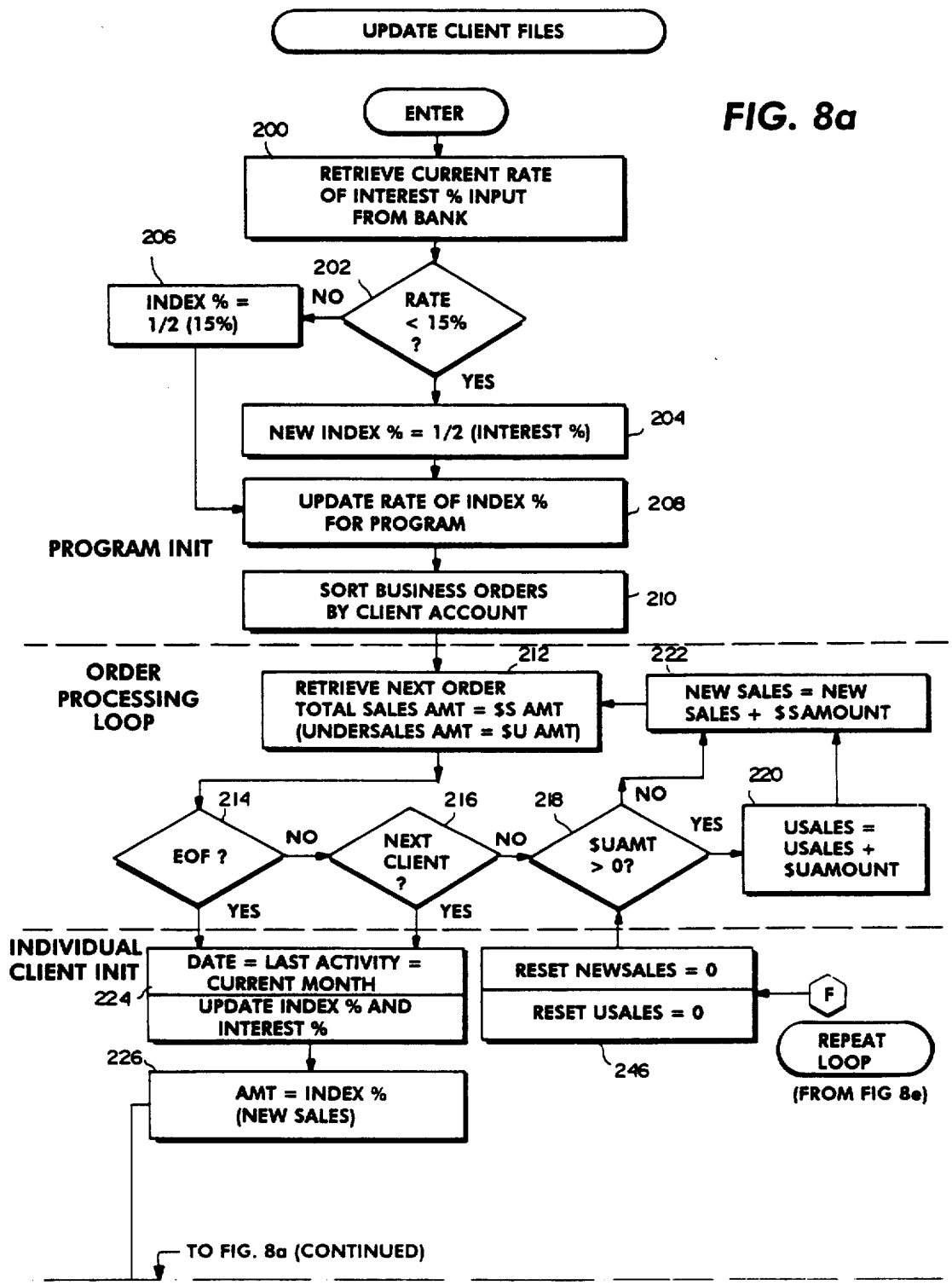
Figure 8A:
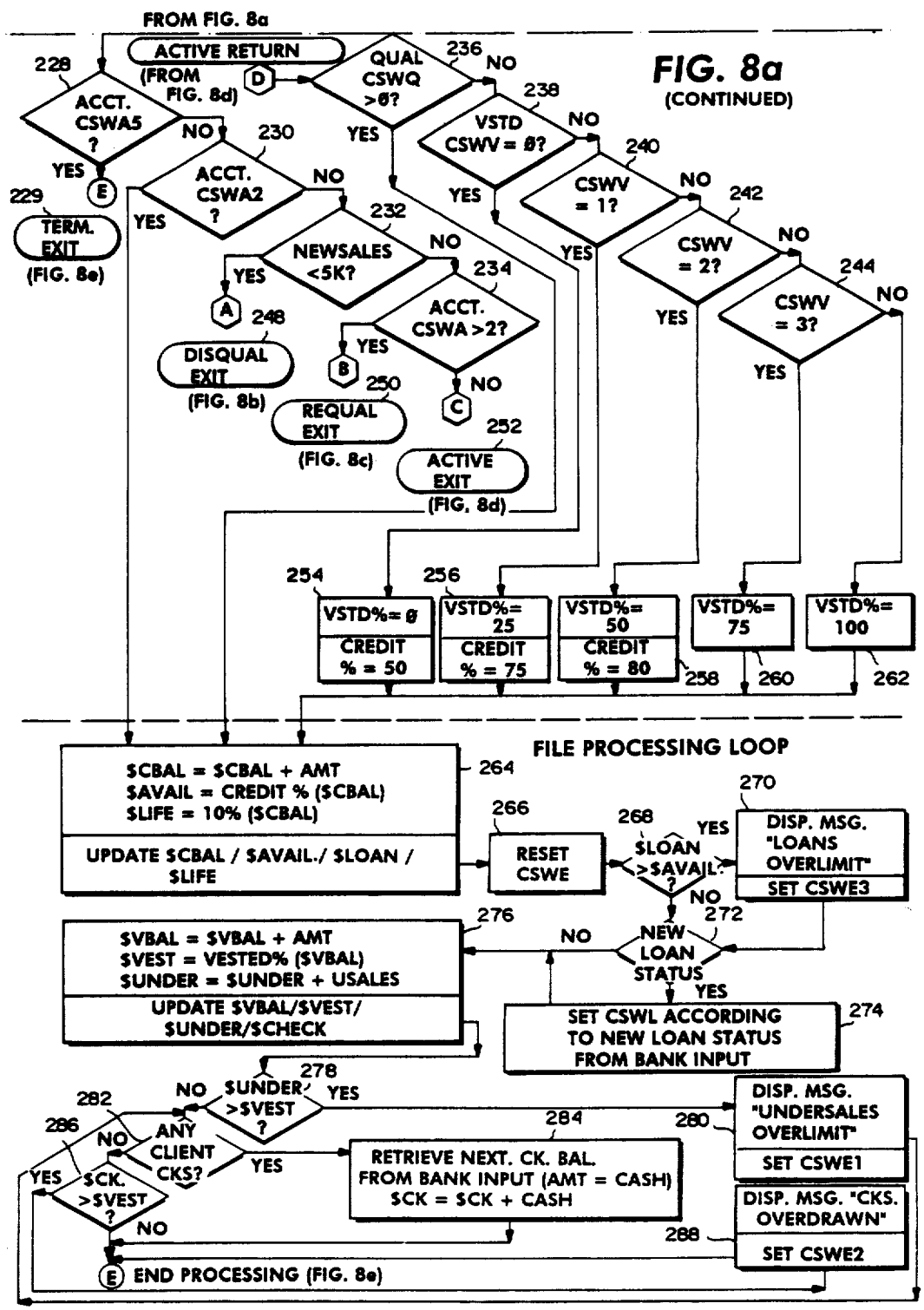
Figure 8B:
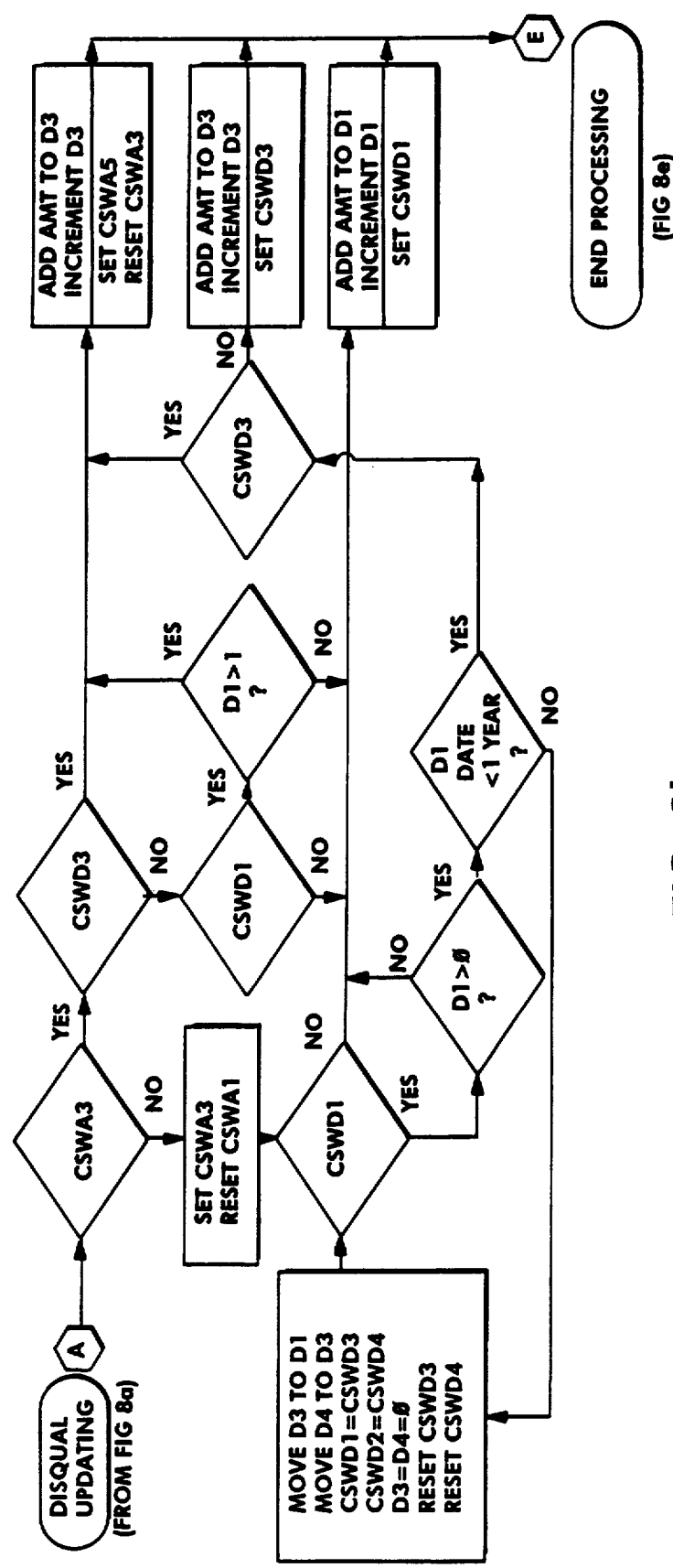
Figure 8C:
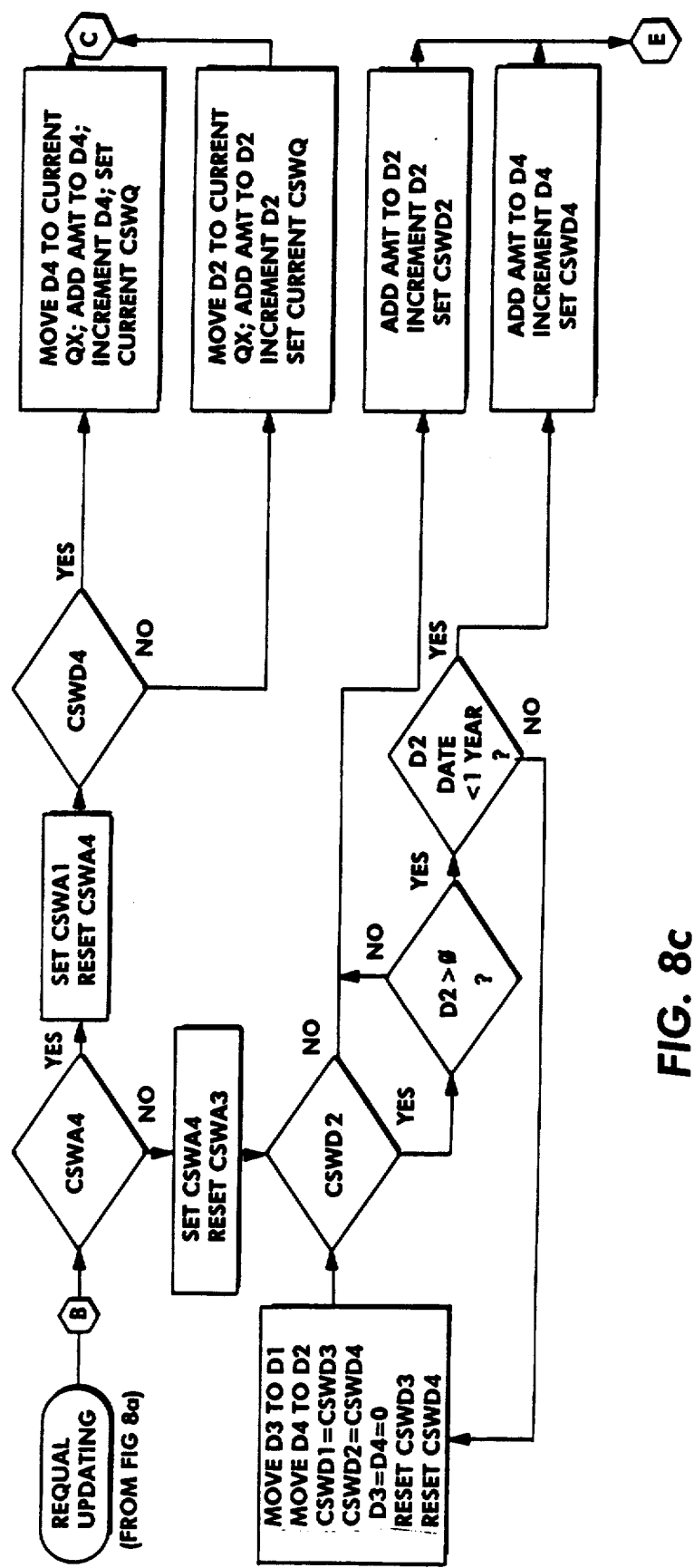
Figure 8D:
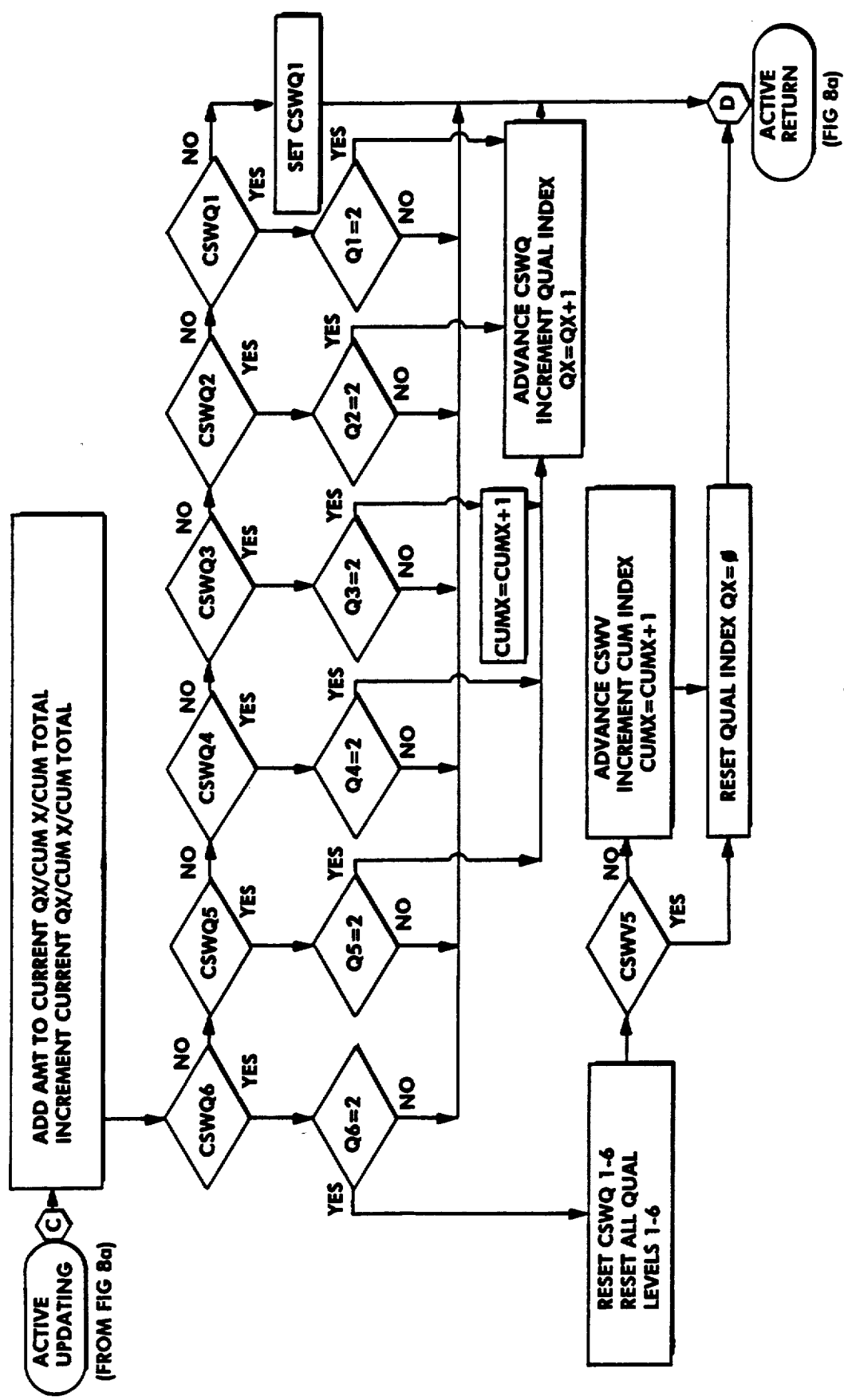

FIGS. 8B, 8C and 8D respectively show the disqualifying updating, the requalifying updating, and the active updating subroutines called by the update client file routine at exit points A, B and C. The operation of these routines will be self-evident to those skilled in the art from a detailed study of the respective flowcharts which will be generally described below.

The disqualifying updating routine of FIG. 8B is entered upon the determination that the client's current new sales are less than $5K. Tests are then made to determine whether the client is disqualified already (CSWA3 bit set), and then whether it is the first or second disqualification. Upon the second disqualification, the client account is terminated. According to the rules defined by this routine, if a client was disqualified more than a year prior to the current date, the year-old disqualification status is eliminated, and the client commences a new disqualification period.

Turning to FIG. 8C, the requalifying updating routine is entered when the client is not fully vested, the current sales are greater than $5K, and CSWA is greater than 2. A check is made to determine whether the client is currently in a requalifying status and if so, the client is placed on active status, the Q array is updated (see client file account from FIG. 4) and the active updating routine is called. If the client is currently in a disqualified status, then the requalifying process is entered and a test is made to determine whether this is the client's first or second requalification according to the criteria previously discussed. As just described above, if a client was disqualified more than a year prior to the current date, the year-old disqualification status is eliminated, and the client commences a new requalification period.

Turning to the "normal" active updating routine of FIG. 8D, clients entering this routine must be in an active status (CSWA1 set). A check is made to determine whether the client has qualified for six periods, (i.e., CSWQ6 set). If it is the second month of the six period, (i.e., QX=2), then all CSWQ's are cleared and all qualification levels are set. The CSWV control status word keeping track of years is then advanced by 1. Of course, once a client is fully vested, no further advancement is required.

The decision blocks beside testing for the sixth two-month subperiod (CSWQ6) test for the fifth to the first two-month subperiod (i.e., CSWQ5 to CSWQ1) and then test for whether the second month of the subperiod has been reached. If the second month has been reached, the CSWQ and the qualification index QX are advanced. On the third two-month increment (i.e., CSWQ3 set and Q3=2), then CUM X is incremented, which means that the client is now vested with the next 6-month increment in his vesting schedule.

Figure 9:
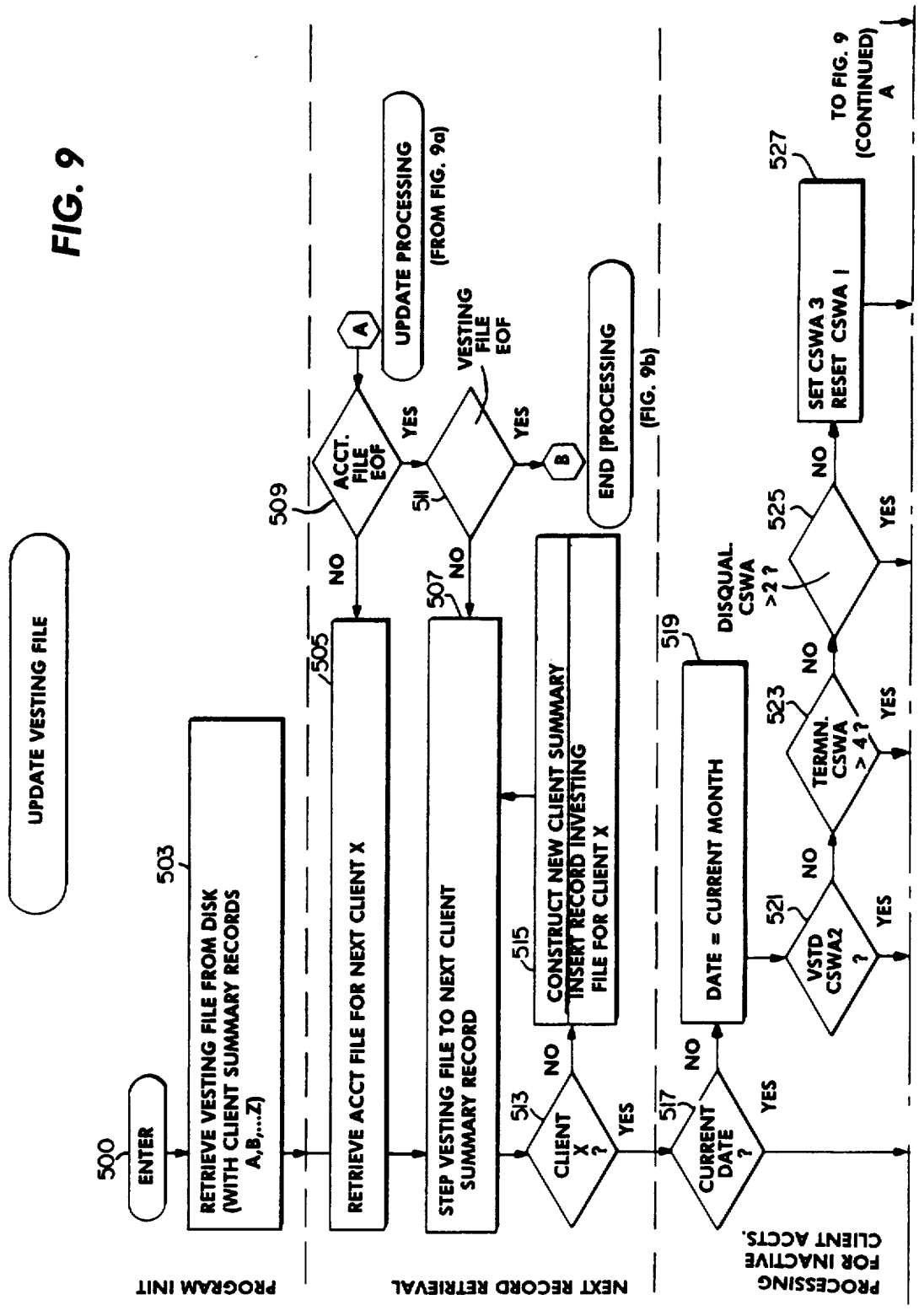
FIG. 9 is a flowchart delineating the sequence of operations performed by the update vesting file routine.

Turning next to the update vesting file routine of FIG. 9, this routine is entered by retrieving the vesting file from the disk (500, 503). The vesting file includes summary records for each client (A, B, . . . , Z) as well as summary information relating to the overall program.

To update all the required vesting file information, the routine retrieves the account file for the next client X (505) and steps the previously retrieved vesting file to the corresponding client summary record (See FIG. 6) for the next client (507). Thereafter, a check is made to determine if client X is in the summary record (513). If not, then the client is a new client and a new client summary record must be constructed and inserted into the vesting file's client summary record field (515). After constructing the new record for client X, as needed, this record is then advanced to at block 507. A yes output will then be produced from the check at 513 and a loop for inactive client account processing will be entered.

A check is next made (517) to determine if it is the current date and if so the vesting file update processing is initiated. If it is not the current date, the system is thereby informed that the client is "inactive" and did not have any transactions during the current month. The date is then updated to the current month (519) and a series of control status word checks are made to determine the client's current status and to determine whether the client needs to be requalified or disqualified. As shown in block 521, a check is made to determine if the client is fully vested. If so, there is no need for further checks since, once this status is reached, it is perpetually maintained by the client without disqualification. Likewise, if the client is terminated as determined at 523, no further checks need be made since no shifts in status are possible.

If block 525 is reached, the client must be either disqualifying or requalifying. If the check reveals that CSWA is not greater than 2, then the current CSWA state must be 1. If this is the case, then CSWA3 is set (i.e., the disqualify state) and CSWA1 is reset to indicate an inactive status (527). The tests in blocks 529 and 531 determine whether the client is in the first or second disqualifying period and blocks 533, 535 and 537 set and reset the appropriate control status words to accurately reflect the current status.

With the client X status data updated, the vesting file data for client X is updated 539 as shown at 541, 543 and 549 below. That is, on the client summary record shown in the Vesting file format of FIG. 6, the date is updated as well as the account and loan status fields (541) (according to the current control state of CSWA and CSWL). Likewise, the Qualification level fields from the vesting file are updated (543) as well as the individual VESTING ACCOUNT and CREDIT ACCOUNT fields (549).

This record primarily includes the current month's increments in the client's vested account (CHECKLIMIT increased) and line of credit (LOANLIMIT increased) based on his activity during the current month. Finally, in order to inform the bank or investment house as to the client's updated limits, pertinent data is entered in a bank record (545) for client X to send to the bank. Such a record is stored as shown in 551, as loaded with the information provided at 547. The updated client summary record and client account file as well as the client bank record, are then stored on disk 3 for client X (551). Next a check is made to see if the end of file has been reached (note reference back to 509) and if not an account file is retrieved for the next client X.

If the client account EOF is reached (509) and if the vesting file EOF is also reached (511) the processing is initiated to update the summary records in the VESTING ACCOUNT file (See FIG. 6). In this regard, the total number of clients in each status are summed, the change from the last month in each category is calculated and such updated vesting file data is stored back on the disk 3 in the appropriate account summary and monthly increment position in the vesting file data arrays (553). The monthly bank record is actually set up using data shown in block 555. The individual bank words stored earlier are then retrieved for all clients (A, B, . . . , Z) (557). The updated bank file is thereafter sent to the bank (559) and the routine is then exited.

While the present invention has been described in terms of one presently preferred embodiment, it is not intended that the invention be limited by such description. It will be apparent to those skilled in the art that many modifications may be made while retaining novel advantage(s) of this invention as defined in the claims which follow.

What is claimed is:

1. A transaction tracking data processing system comprising:
   a data entry means for entering client business sales order data and client account identification data;
   memory means for storing business sales order data in a plurality of client account files, each client account file being identifiable by said client account identification data;

central processing control means for processing said business sales order data, said control means including means for accessing at least one of said client account files and for retrieving client business sales order data relating to a predetermined time period, means for determining a cumulative business sales order related total for said predetermined time period for a plurality of client accounts, means for comparing a predetermined sales order related threshold with said sales order related total;

means for determining a predetermined percentage of said business sales order total for said predetermined time period, and means, responsive to said means for comparing, for storing in said memory means an indication of an amount of funds to be credited to at least one client account corresponding to said predetermined percentage of the business sales order total for said predetermined time period when said client business sales order total exceeds said predetermined threshold, wherein said control means further includes control status word means including at least one control status word having a plurality of bit positions each defining a state of said one control status word, each bit position being indicative of a predetermined control state, said control means including means for controlling the program execution sequence depending upon the states of said at least one control status word.

2. A transaction tracking data processing system according to claim 1, wherein said central processing control means includes means for setting bit positions in said at least one control status.

3. A transaction tracking data processing system according to claim 1, wherein said control means includes updating means responsive to increases in the length of time the client's business sales order data has exceeded the predetermined threshold to update data indicative of amount to be vested to the client in said at least one account, said updating means including means responsive to the control state of said at least one control status word for determining the updated amount to be vested to the client.

4. A transaction tracking data processing system according to claim 3, wherein said at least one control status word indicates a length of time the client's business sales order data has exceeded the threshold.

5. A transaction tracking data processing system according to claim 3, wherein said memory means includes a plurality of client files, each of said client files including means for storing data reflecting an amount invested in said at least one client account, and wherein each client file further includes means for storing active control states of said at least one control status word.

6. A transaction tracking data processing system according to claim 1, wherein said data entry means includes an associated means for displaying, and wherein said control means including means for controlling the display to display the control states of said at least one control status word.

7. A transaction tracking data processing system according to claim 1, wherein said system includes a plurality of control status words, one of which said control status words being dedicated to indicating a plurality of error conditions.

8. A transaction tracking data processing system according to claim 7, further including means for monitoring the states of said one control status word for displaying at least one error message in response to a detected error condition.

9. A method of operating a transaction tracking data processing system having a data entry means for entering client business sales order data, memory means for storing client business sales order data, and central processing control means for processing said client business sales order data, said method comprising the steps of:

entering the client's business sales order data and client account identification data for a plurality of clients via data entry means;

storing each client's business sales order data in said memory means in a client account file identified by said client account identification data;

accessing by said central processing control means a client account file and retrieving business sales order data accumulated over a predetermined period of time;

determining by said central processing control means a cumulative business sales order related total for each of said plurality of accounts for said predetermined period of time;

comparing a predetermined business sales order related threshold with said sales order related total by said central processing control means;

determining a predetermined percentage of said cumulative business sales order related total for said plurality of accounts by said central processing control means; and transferring to the memory means an indication of an amount of funds to be deposited in at least one client account corresponding to said predetermined percentage upon the central processing control means indicating that said threshold has been exceeded, wherein said control means further includes control status word means including at least one control status word having a plurality of bit positions each defining a state of said one control status word, each bit position being indicative of a predetermined status condition, wherein the method further includes the step of controlling program execution sequence depending upon the state of said at least one control status word.

10. A method according to claim 9, further including the step of setting bit positions in said at least one control status word.

11. A method according to claim 10, further including the step of setting the states of said at least one control status word to indicate the length of time a client's business sales order data has exceeded said predetermined threshold.

12. A method according to claim 9, further including the step of storing active control states of said at least one control status word in each of a plurality of client files.

13. A method according to claim 9, wherein said system includes a plurality of control status words, one of said control status words being dedicated to indicating a plurality of error conditions.

14. A method according to claim 13, further including monitoring the states of said one control status word for displaying at least one error message.

15. A business order transaction tracking data processing system comprising:

memory means for storing accumulated business sales order data relating to a plurality of clients, said sales order data being accessible by client account identification data;

means for entering said business sales order data and said client account identification data;

control means accessing business sales order data from a client account file and for retrieving business sales order data accumulated during a predetermined time period;

means for comparing cumulative business sales order data over said predetermined time period with a predetermined threshold and for generating a qualify signal if said threshold is exceeded;

means responsive to said qualifying signal for storing data in said memory means representative of funds to be deposited in at least one client account; and means for periodically transferring to said memory means at least updated data representing funds to be deposited in said at least one client account as a function of predetermined increases in the period of time over which the client business order sales data has exceeded said predetermined threshold, wherein said control means includes control status word means including a plurality of control status words, each control status word having a plurality of bit positions, each defining a state of said one control status word, each bit position being indicative of a status condition, said control means including means for setting each of said bit positions in response to one of said conditions; and display means for displaying the current states of a plurality of control status words.

16. A transaction tracking data processing system comprising:

data entry means for entering business sales order data and client account identification for a plurality of clients;

memory means for storing said client business sales order data, said memory means including a plurality of client files accessible by said client account identification data;

control means for accessing said business sales order data from said memory means relating to a predetermined period of time and for determining cumulative sales order related data for said predetermined period of time, said control means including means for determining whether a client's cumulative business sales order data exceeds a predetermined threshold;

said control means including control status word means having at least one control status word having a plurality of bit positions, each bit position having a control state indicative of a predetermined status condition;

said control means including means responsive to an indication that said threshold is exceeded for storing account data in said memory means indicative of funds to be deposited in at least one client account; and means for periodically updating said account data as a function of the control state of said at least one control status word.

17. A transaction tracking data processing system according to claim 16, wherein said means for determining is operable to determine when said predetermined threshold has been exceeded for a predetermined period of time, and includes qualifying period recording means for storing an indication of the period of time over which said threshold has been exceeded.

18. A transaction tracking data processing system according to claim 17, including means responsive to said qualifying period recording means for storing an indication of accrued client vested rights in said at least one account, whereby said accrued vested rights are a function of the period of time the threshold has been exceeded.

19. A transaction tracking data processing system according to claim 18, wherein said memory means includes means for storing, for each qualifying client, an indication of the funds to be invested in a first account and a second account, and wherein said means for storing an indication of accrued client vested rights includes a first field for storing data indicative of the funds which have become vested in the client in the first account, and a second field for storing data indicative of the credit available to said client based on said second account.

20. A transaction tracking data processing system according to claim 16, wherein each of said client files is organized in a predetermined format and further including means for storing data indicative of the amount invested in said at least one client account, and qualification level indicating means for storing data related to the length of time the client has exceeded said predetermined threshold.

21. A transaction tracking data processing system according to claim 20, wherein said memory means includes means for storing a vesting account file for storing summary data related to all client accounts.

22. A transaction tracking data processing system according to claim 20, wherein said data entry means includes an associated display, said data entry means including means for entering an account status request, said memory means including means for storing client accounts in a predetermined format, and said control means including means for controlling the display to display data in a format corresponding to the account format stored in said memory means.

23. A transaction tracking data processing system according to claim 16, wherein said at least one control status word indicates the length of time the client has exceeded the threshold.

24. A transaction tracking data processing system according to claim 16, wherein said memory means includes means for storing data indicative of the client's authorization to write checks drawn on said at least one account.

25. A transaction tracking data processing system according to claim 16, wherein said memory means includes means for storing data indicative of the client's authorization to receive loans based on funds in said at least one account.

26. A transaction tracking data processing system according to claim 16, wherein said memory means includes means for storing data indicative of the client's authorization to purchase goods under the current market value based on funds in said at least one account.

27. A transaction tracking data processing system according to claim 16, wherein said means for storing includes means for storing an indication of a life insurance benefit associated with said at least one account.

* * * * *